United States Patent
Abildgaard et al.

(10) Patent No.: US 6,712,194 B1
(45) Date of Patent: Mar. 30, 2004

(54) SORTING CONVEYER WITH A TILTING MECHANISM

(75) Inventors: Anne-Mette Hjortshøj Abildgaard, Arhus C (DK); Jan Gullev Christensen, Randers (DK)

(73) Assignee: Crisplant a/s, Arhus (DK)

( * ) Notice: Subject to any disclaimer, the term of this patent is extended or adjusted under 35 U.S.C. 154(b) by 0 days.

(21) Appl. No.: 09/806,458

(22) PCT Filed: May 22, 2000

(86) PCT No.: PCT/DK00/00272

§ 371 (c)(1),
(2), (4) Date: May 14, 2001

(87) PCT Pub. No.: WO00/71446

PCT Pub. Date: Nov. 30, 2000

Related U.S. Application Data

(60) Provisional application No. 60/193,443, filed on Mar. 31, 2000.

(30) Foreign Application Priority Data

| May 21, 1999 | (DK) | 1999 00719 |
| Mar. 2, 2000 | (DK) | 2000 00342 |
| Mar. 31, 2000 | (US) | 60/193,443 |

(51) Int. Cl.⁷ .................................. B65G 47/46
(52) U.S. Cl. ................................. 198/370.04
(58) Field of Search ................... 198/370.04, 575

(56) References Cited

U.S. PATENT DOCUMENTS

| 4,722,430 A | | 2/1988 | Canziani |
| 4,846,335 A | * | 7/1989 | Hartlepp ............... 198/370.04 |
| 5,335,767 A | * | 8/1994 | Killer et al. ........... 198/370.04 |
| 5,990,437 A | * | 11/1999 | Coutant et al. ..... 198/370.04 X |
| 6,135,262 A | * | 10/2000 | Polling .................. 198/370.04 |
| 6,152,280 A | * | 11/2000 | Bruun ................... 198/370.04 |

FOREIGN PATENT DOCUMENTS

| DE | 8714976 A | 8/1985 |
| EP | 0664262 A1 | 7/1995 |
| EP | 0808784 A2 | 11/1997 |
| EP | 0919495 A2 | 2/2001 |
| GB | 2153772 A | 8/1985 |
| GB | 2197633 A | 5/1988 |
| SU | 1641743 A1 | 3/1989 |
| WO | WO 9009944 | 9/1990 |
| WO | WO 9808759 | 3/1998 |
| WO | WO 9834859 | 8/1998 |

OTHER PUBLICATIONS

Hager et al., "Untersuchungen an Kippelementen für Stückgutsortieranlagen—Teil I," Fordern und Heben, DE, Krausskopf Verlag für Wirtschaft. Mainz, vol. 47, No. 9, Sep. 1, 1997 (with English summary).

Hager et al., "Untersuchungen an Kippelementen für Stückgutsortieranlagen—Teil II," Fordern und Heben, DE, Krausskopf Verlag für Wirtschaft. Mainz, vol. 47, No. 10, Oct. 1, 1997 (with English summary).

* cited by examiner

Primary Examiner—James R. Bidwell
(74) Attorney, Agent, or Firm—Birch, Stewart, Kolasch & Birch, LLP

(57) ABSTRACT

A tilting mechanism comprising an article-supporting member, such as a tray or a conveyor belt for a sorter for transporting and sorting various articles is disclosed. The article-supporting member may be held tilted about two parallel axes each being fixed with respect to the tilting part or the stationary part and being movable along a predetermined path with respect to the other part. Further is disclosed a sorter comprising article-supporting members arranged on tilting mechanisms to tilt the members when passing curves and during induction of articles from the side of the sorter so as to prevent articles from sliding off the members and thus enable the sorter to operate at much higher conveying speeds than known sorters.

30 Claims, 21 Drawing Sheets

SORTING CONVEYER WITH A TILTING MECHANISM

This application is the national phase under 35 U.S.C. §371 of PCT International Application No. PCT/DK00/00272 which has an International filing date of May 22, 2000, which designated the United States America which claims the benefit of Provisional application Ser. No. 60/193,443, filed Mar. 31, 2000.

The present invention relates to a tilting mechanism comprising an article-supporting member, such as a tray or a conveyor belt or any other suitable member for a sorter for transporting and sorting various articles. The article-supporting member may be held tilted about two parallel axes each being fixed with respect to the tilting part or the stationary and being movable along a predetermined path with respect to the other part.

The present invention further relates to a sorter comprising article-supporting members arranged on tilting mechanisms to tilt the members when passing curves and during induction of articles from the side of the sorter so as to prevent articles form sliding off the members and thus enable the sorter to operate at much higher conveying speeds than known sorters.

BACKGROUND

Sorters having tilt mechanisms for tilting trays by rotating the tray about a tilting axis being stationary with respect to a frame part of the tilting mechanism and to the sorter are well-known. Tilting mechanisms divided into two separate mechanisms, normally one mechanism for discharging to each side, in which each mechanism has a tilting axis are also known.

It is further known from EP 0 664 262 A1 to have a tilting mechanism that has a simple movable tilting axis, in this mechanism two axles move in linear paths being a horizontal and a vertical path. The drive means is a rail along the moving path of the tilt-sorter.

U.S. Pat. No. 4,722,430 discloses a mechanism that comprises "a rotatable pinion placed on one of the uprights", the uprights being placed on a frame part and "an arc of a pinion co-operative hoop extending from the plate for engagement with the pinion", the plate here being the tilt tray. There is no disclosure in this document about tilting of the tray to other angles than a full tilt or no tilt.

The stationary tilt axis and the simple movable tilt axis provides no or only limited possibility to design the movement of the article-supporting member tilted by the tilting mechanism in an advantageous way so as to e.g. take advantage of the act of gravity on the member and an article during discharge of the article from the member or to discharge the article at a suitable distance from the sorter transversely to the conveying direction of the sorter without requiring an excessive distance between the article-supporting member and the stationary track means of the sorter.

The conveying speed of most known sorters is restricted due to the risk of articles sliding off the article-supporting members of the sorter during passage of horizontal curves due to the so-called centrifugal force. Another speed limiting factor is the induction of articles onto the article-supporting members of the sorter from the side of the sorter by induction lines being arranged at an angle to the sorter so that the articles are given a velocity in the conveying direction of the sorter as well as in the transversal direction. The higher the conveying speed the higher the transversal speed which may cause the article to slide past the article-supporting member and off the sorter. The transversal speed may be decreased by decreasing the angle between the conveying direction of the sorter and the conveying direction of the induction line but the induction station will in that case take up an excessive area. Sorter do usually maintain the article-supporting surfaces at horizontal positions during the operation of the sorter except for tilt tray sorters during discharge of articles.

BRIEF DESCRIPTION OF THE INVENTION

The tilting mechanism of the present invention makes it possible to provide an advantageous design of the tilting movement of the article-supporting member. It has been realised that by letting the frame part and the tilting part of the tilting mechanism be mutually engaging about at least two points, each of the points being fixed with respect to one of said frame part and said tilting part and being movable along a predetermined path with respect to the other of said two parts, and by letting at least one of the predetermined paths being nonlinear, it is possible to design the tilting movement to advantageous embodiments as opposed to the above-mentioned known tilting mechanisms.

It is an object of the present invention to provide a tilting mechanism in which the tilting part, comprising an article-supporting member and the article thereon, may be tilted in a manner so that the centre of gravity of the tilting part and an article supported thereon is lowered during a first part of the tilt, so as to minimise the force that is needed for performing the tilt. Other objects of the present invention will be understood from the following description.

It is a further object of the present invention to provide a sorter having tilting mechanisms that are controlled to tilt an article-supporting surface of an article-supporting part e.g. a tray or a cross-belt, in a ungraduated way and to control this tilt so as to tilt in any angle within a range at any time, so that the article is kept on the surface or discharged from the surface as desired, e.g. at high speed in horizontal curves, at high speed induction of articles from the side of the sorter and when being discharged from the article-supporting surface at the discharge stations.

Thus, the present invention relates to a tilting mechanism for a sorter comprising a frame part, a biting part for supporting an article-supporting part of the sorter, the article-supporting part having an article-supporting surface, drive means for tilting the tilting part of the mechanism, the frame part and the tilting part mutually engaging about at least two points, each of the points being fixed with respect to one of said frame part and said tilting part and being movable along a predetermined path with respect to the other of said two parts, at least one of the predetermined paths being non-linear.

The frame part and the tilting part engage in a preferred embodiment of the invention mutually about at least two axes being substantially parallel, each of the axes being fixed with respect to one of said frame part and said tilting part and being movable along a predetermined path with respect to the other of said two parts, the frame part and the tilting part each defining a main direction, the main direction of the frame part being defined by a vector having the frame part as its initial system and the main direction of the tilting part being defined by a vector having the tilting part as its initial system, the vectors being coincident in an article-carrying non-tilted position of the tilting part in which position the vectors are projections of a vertical vector on a plane perpendicular to the axes, both the vectors pointing in a direction away from the frame part, the predetermined paths being designed so that both axes during the course of a tilting operation are moved with a component in the main direction of the part with respect to which the respective axis moves.

The main directions are hereby defined as directions "painted" on the two parts of the mechanism, and the directions are moved as the part moves. These main directions are defined from the position of the tilting part that in general means that the supporting surface is horizontal.

During the course of a tilting operation, at least one of the axes may be moved in a direction having a component in the main direction as well as in a direction having a component in the opposite direction of the main direction of the part relatively to which said axis moves.

The non-linear path may in a preferred embodiment of the invention be shaped so that when the tilting part is in a predetermined tilt position any rotating movement of the drive wheel will cause the centre of gravity of the tilting part including the article-supporting part and optionally an article supported thereon to move in a direction having a positive component in the main direction of the frame part.

This predetermined tilt position is the position where the translating movement of the article and the tilting mechanism is zero and the translating movement shifts from having a component in a direction downwards or in the direction of the gravity to have a component in the upwards direction or in the opposite direction of the gravity. This will cause the movement to be accelerated by the gravity before reaching the predetermined tilt position and to be stopped after passing the predetermined tilt position.

In a preferred embodiment of the invention the non-linear path may further be shaped so that when the tilting part is in a further predetermined tilt position, any rotating movement of the drive wheel will cause the tilting part to rotate in the same direction for example towards the non-tilted position.

This embodiment will cause the rotation of the tray and the article to stop at the predetermined tilt position and revert in the same direction. This particular movement is able to equalise the tilt moment as the friction that holds the articles in place on the side which is higher up the tray is decreased by the tray accelerating away from the article, and the friction that holds the articles in place on the side which is lower on the tray is increased by the tray accelerating towards the article. Thereby, the articles that have the longest distance from the discharge station are caused to move faster and the articles that have the shortest distance to travel to move slower towards the discharge station during a discharge operation.

The centre of gravity of the tilting part including the article-supporting part and optionally an article supported thereon is advantageously moved in a direction having a component in the negative main direction of the frame part during a main part of the course of a tilting operation.

Alternatively or additionally, the centre of gravity of the tilting part including the article-supporting part and optionally an article supported thereon may be moved in a direction having a component in the positive main direction of the frame part during an end part of the course of a tilting operation.

If the centre of gravity is to be lifted during a tilt operation, the drive have to be dimensioned to be able to lift the maximum article weight plus the mass of the tilting part, but if the centre of gravity is only lowered during the tilt, driving means of less output effect can be used.

It is known that if the drive means have to act as brakes for the tilting mechanism, this will cause wear of the drive means. This problem will mainly be present where the drive means have to brake the tilting mechanism as well as the articles, such as at the end of a down tilt. The present invention makes it possible to have the tilting part raised at the end of the tilt and thereby brake the tilt by means of the gravity, which will cause the drive means to be used less as a brake.

It is preferred that control means, preferably control means of the individual tilting mechanism, is adapted to tilt the tilting part in order to prevent an optional article from sliding off the article-supporting surface when being subjected to a centrifugal force or other transversal forces, e.g. to tilt in a predetermined angle to prevent an optional article from sliding off the article-supporting surface when being subjected to a centrifugal force or other transversal forces.

In a further embodiment of the invention control means is adapted to tilt the tilting part in order to prevent the article from sliding off the article-supporting surface when the article is loaded or inducted onto the article-supporting surface from the side of a moving sorter on which the mechanism is arranged, the tilting part is tilted so as to decrease the angle between the velocity of the article as it is loaded onto the article-supporting surface and the main direction of the tilting part.

The decreased angle causes the article-supporting surface to brake the movement of the article in the transversal direction of the sorter. Thereby, the speed of the sorter may be increased beyond the upper limit set by the maximum velocity with which an induction line can load articles onto horizontal article-supporting surfaces of a sorter from one side of the sorter without causing the articles to slide off to the other side of the sorter. It will be of importance to determine the optimal angle so that the article-supporting surface provides a substantially brake force but the article do not slide off the article-supporting surface as the article is resting on the surface.

It is preferred that the tilting part reverts to an article carrying position as soon as the article is loaded on to the article-supporting surface in order to prevent the article from sliding off the surface due to the tilted position. By reverting the surface to the carrying position immediately after the article has been loaded onto the surface, it is possible to decrease the angle between the main direction and the loading velocity further and there by be able to increase the induction speed of the article as well as the conveying speed of the sorter.

The tilting part may preferably be tilted to any degree of tilt ungraduated between a non-tilted position and an extreme position.

As an alternative embodiment of the invention, the axes may be directed non-parallel to a direction o f movement of the sorter. In a most preferred embodiment of the invention a first axis of the tilting mechanism is movable along a predetermined, linear path and a second axis is movable along another predetermined, non-linear path. Furthermore, it is advantageous that a substantial part of the weight of the article-supporting part and an optional article thereon in a non-tilted position is carried by at least one support wheel with an axis coinciding with the second axis and arranged on the part on which the second axis is fixed, the support wheel being supported on a curved surface of the part on which the second axis is movable, said surface has, at the point of engagement with said wheel, a radius of curvature larger than or the same as the radius of the wheel. The driving means may comprise a drive wheel with an axis coinciding with the second axis and arranged on the part on which the second axis is fixed, the drive wheel engaging the part on which the second axis is movable so as to drive the tilting part of the mechanism.

In an embodiment of the invention the drive wheel is a toothed wheel and the part with which the drive wheel engages is equipped with a toothed rim engaging with the drive wheel. As one alternative, the drive wheel may be a friction wheel and the part with which the drive wheel engages may be equipped with a friction surface engaging with the drive wheel. In a second alternative, the drive wheel is a notched wheel and the part with which the drive wheel engages is equipped with a notched surface engaging with the drive wheel. Preferably, the path of the first axis is a linear path being substantially parallel to the main direction of one of the tilting part and the frame part.

It is advantageous that the non-linear path of the tilting mechanism is shaped to make the tilting operation perform the tilt so that the tilting part in a non-tilted position is kept stable by a shape of the path that makes it necessary for the driving means to lift the tilting part against the direction of gravity, the article-supporting part and an optional article in a first part of the tilt, the centre of gravity of the tilting part, the article-supporting part and the optional article is moved in a direction having a negative component in the main direction of the frame part, in a second part of the tilt, the second part of the tilt being substantially a main part of the tilt, and the centre of gravity of the tilting part, the article-supporting part and the optional article is moved in a direction having a positive component in the main direction of the frame part in a last part of the tilt.

In an embodiment of the invention the tilting part comprises a second tilting part for tilting the article-supporting part of the mechanism about an axis being substantially perpendicular to the axes as well as to the main direction of the frame part.

This will make it possible to tilt the article-supporting surface in a direction so that when the tiling mechanism passes vertical curved of the track, the article-supporting surface can be maintained in a substantially horizontal position. Control means may preferably be adapted to tilt the second tilting part in order to prevent an optional article from sliding off the article-supporting surface when being subjected to an acceleration or other forces in the direction of the axes.

In an alternative or further embodiment of the invention the tilting part comprises rotation part for rotating the article-supporting part of the sorter about an axis being substantially parallel to the main direction of the frame part.

This is especially an advantage when the mechanism moves through a horizontal curve of the track and the article supported by the article-supporting surface is further supported by another mechanism immediately adjacent to the mechanism in question. The rotation will make It possible to maintain the two adjacent article-supporting surfaces in line without mutual rotating movements during passage of horizontal curves of the main track, thereby minimising the risk of articles being moved off the surfaces due to repeatedly mutual rotations of the surfaces supporting the article, e.g. when an article is conveyed on the conveyor for a long time period before discharge.

This rotation of the article-supporting surface may be controlled by control means adapted to rotate the rotation part.

The drive means of the tilting mechanism may comprise an electrical motor for which the power may be supplied through a pair of collector shoes. Alternatively, the power for the electrical motor may supplied through inductive power transfer means or by means of an electrical generator driven by a wheel engaging with a stationary part of the sorter.

The drive means may instead comprise a hydraulic motor for which the power may be provided from the motion of the sorter by means of a hydraulic pump driven by a wheel engaging with a stationary part of the sorter or the power is provided by a hydraulic pump driven by an electrical motor, for which the power may be supplied through a pair of collector shoes. Alternatively, the power for the electrical motor may supplied through inductive power transfer means or by means of an electrical generator driven by a wheel engaging with a stationary part of the sorter.

As another possibility, the drive means may comprise a pneumatic motor for which the power may be provided from the motion of the sorter by means of a pneumatic pump driven by a wheel engaging with a stationary part of the sorter, or the power is provided by a pneumatic pump driven by an electrical motor, for which the power may be supplied through a pair of collector shoes. Alternatively, the power for the electrical motor may supplied through inductive power transfer means or by means of an electrical generator driven by a wheel engaging with a stationary part of the sorter.

The article-supporting part of the tilting mechanism may comprise an endless belt defining an article-supporting surface and drive means for driving the belt in a direction substantially perpendicular to a conveying direction of the sorter. In preferred embodiments of the invention, however, the article-supporting part comprises a tray having an article-supporting surface.

According to a further alternative embodiment, the article-supporting part comprises rollers that may rotate freely around axes that are substantially parallel to the conveying direction of the sorter.

This embodiment may also have a braking system to brake the rollers, so that when an article is supported by the rollers these are braked to prevent the article from rolling/sliding off the article-supporting surface and the roller are unbraked as the article is loaded onto and discharged from the article-supporting surface to ease the sliding of the articles. This embodiment is in particular preferred when the articles have a surface that has a high friction coefficient.

According to another embodiment of the invention, the tray along a substantial part of its longitudinal mid-axis comprises a ridge extending parallel to the two parallel axes and extending upwardly from the article-supporting surface of the tray so as to prevent articles from sliding past the ridge at any tilt position of the tray.

This ridge will when the tray is tilted prevent articles on the opposite side as the discharge station from being discharged thus making it possible to have two articles on one tray and discharge said articles at separate discharge stations. The mechanism may in a preferred embodiment comprise a position means for determining at least whether the tilting part is in a predetermined tilt position, such as whether the tilting part is in its article carrying position or in a max tilt position. It is further preferred to have a device or position means that indicates the position of the tilt, such as on a scale having graduation with a plurality of marks or a scale which is substantially ungraduated.

The positioning means may be made in a number of ways both using a device that only allows to measure in a predetermined scale as described or a device which allows ungraduated measurement.

In a preferred embodiment the device for measuring ungraduated scale is to be used and this type of measurement could be performed by using a device that is measuring the resultant force on the tilting part so as to determine the tilt position. When using a resultant force measurement this device may also be used for measuring the so-called centrifugal force when the mechanism is moving through a horizontal curve. Measurement of the centrifugal force may be used for determining a tilt angle, for providing information to a control unit for controlling the tilt so as to assure that the article-supporting surface is substantially perpendicular to the resultant force or at least has an angle towards the direction of the resultant force being sufficient to prevent articles from sliding off the surface.

A device of the described type could be a pendulum but also other devices for measuring the direction of the resultant force may be applied.

Such a device is also to be used after a "power off" situation for calibrating the tilt position, as the sorter on which the mechanism is arranged is not moving the direction of the resultant force should be perpendicular to the surface of the article-supporting surface when the tilting part is in a non-tilted position. A calibration could also be made as the mechanism is moving with constant speed on a calibrating section, such as a flat straight section.

In a further embodiment the graduated measurements are made by at least one switch and a counter part indicating when the tilting part is in the for the switch and counterpart characteristic position. Such a switch could be a traditionally mechanical switch such as a micro switch or could be another type of switch such as a light gauge, a photoelectric cell, an inductive device or a magnetic switch.

In a preferred embodiment the tilting part is positioning the article-supporting surface so that the main direction of the tilting part and the direction of the resultant force are substantially parallel as long as the mechanism is in an article-supporting mode.

One particularly embodiment of a tilting mechanism for a sorter according to the invention comprises
  a frame part,
  a tilting part comprising a tray for supporting of articles,
  the tilting part being tilted by means of an electrical motor to which power is supplied by means of a pair of collectors shoes and a conductor rail on a stationary part of the sorter,
  the frame part and the tilting part mutually engaging about at two axes being substantially parallel, one of said axes being fixed to said tilting part and the other of said axes being fixed to said frame part,
  the axis that is fixed to the tilting part is placed substantially lower than the axis that is fixed to the frame part when the tilting part is in a non-tilted position,
  a steering wheel having an axis coinciding with the axis that is fixed to the tilting part is mounted on the tilting part, the axis being movable in a main direction of the frame part as defined previously, the steering wheel moves in a slot formed in the frame part,
  an axle placed on the axis that is fixed to the frame part having a smooth wheel to support the weight of the tilting part and articles supported thereon, a drive wheel to induce the tilting movement as well as a gear and the electrical motor,
  the drive wheel is engaging a non-linear pinion part and the smooth wheel engaging a similar and parallel smooth part, said pinion part and said smooth part forming parts of the frame part,
  this complete configuration is duplicated in each end of the tray.

The present invention furthermore relates to a sorter running on a track, the sorter comprising a plurality of article-supporting parts placed on tilting mechanisms, the tilting mechanisms being able to tilt the article-supporting parts in a direction substantially perpendicular to the conveying direction of the sorter and being capable of tilting the article-supporting parts inwardly when the article-supporting parts, during operation of the sorter, pass curves so that the influence of centrifugal forces caused by the curve passage at the transport speed of the sorter is counteracted.

It is understood that the article-supporting parts may be e.g. trays or cross-belts.

In an embodiment of the invention the sorter comprises at least one train of tilting mechanisms each having at least two tilting mechanisms and it preferably comprises a plurality of trains. Each train is controlled to move individually along the track of the sorter, preferably in individual paths, between induction stations and discharge station and thereby provide the sorter with a high flexibility and make it possible to have a limited number of tilting mechanisms and article-supporting member on a sorter of which the track extends between induction stations and discharge stations with high mutual distances. The trains may be enabled to change conveying direction along the same parts of the track and the track may be provided with shifting means for shifting the trains between different track parts.

Furthermore, each of the at least one train may comprise a braking mechanism for preventing movement between the mechanism and the track.

Also each of the at least one train may comprise a velocity measurement device for measuring the velocity of the train relatively to the track.

The angle of inward tilting is as described previously preferably adapted in dependence of the conveying speed of the sorter and/or the curvature so that the counteracting of centrifugal forces is of such a degree that articles supported on the articles-supporting parts will be prevented from sliding off the article-supporting parts.

The adaptation of the angle of tilting may furthermore comprise re-adjustment of the article-supporting part to a substantially non-tilted position if the sorter speed is slowed down to a speed where the centrifugal forces are substantially reduced, or the sorter stops.

This also includes that the non-tilted position may be obtained in advantage to a power off situation so that the tilting mechanisms are in non-tilted position shortly prior to the sorter comes to a halt.

The inward tilting of the tilting mechanism of the sorter according to the present invention is preferably controlled in response to a control means sensing the centrifugal force to which an article supported on an article-supporting means is subjected.

The tilting mechanism of the sorter according to the present invention is preferably and advantageously a tilting mechanism according to the present invention as described previously.

In one embodiment of the invention the article-supporting parts are trays but also embodiments where the article-supporting parts are endless belts or comprise rollers are possible according to the present invention.

In an alternative embodiment of the invention a combination of article-supporting parts is provided, e.g. at least one tilting mechanism comprising a tray having an article supporting surface and at least one tilting mechanism comprising an endless belt defining an article-supporting surface and drive means for driving the belt in a direction substantially perpendicular to the conveying direction of the sorter. In other embodiments the combination comprises other combinations of article-supporting parts.

In an embodiment of the invention the each tilting mechanism has a unique number. The unique number is used for identification either for a control unit such as a central computer device or to communicate the identity to an induction station device, a discharge station or other devices of the sorter.

In a preferred embodiment of the invention the unique number of the tilting mechanism is provided in a machine readable form on the surface of the mechanism. Hereby the identification of the mechanism and thus the optional article on the article-supporting part of the mechanism, is possible by a machine reading device arranged along the track. The identification is in an embodiment used to determine whether the optional article should be discharged or otherwise processed or alternatively whether an article should be inducted onto an empty article-supporting surface.

Furthermore, the identification may be used for detection of the position of the mechanism and in general the optional article on the mechanism.

In a further embodiment of the invention a plurality of the mechanisms, and preferably each of the mechanisms, comprises a logical unit.

The logical units provide numerous advantages and may be enabled to communicate the current position of the mechanism to a central control system or whether there is an article on the mechanism. Information about the future steps of the mechanism such as where the articles are to be inducted onto the article-supporting surface of mechanism and where and when the articles are to be discharged from the mechanism may also be communicated between the logical units and a central control system of the sorter. Also the degree of tilt during passage of horizontal curves and other operational parameters may be calculated or otherwise determined by means of the logical unit. It is an option to have one logical unit per mechanism but also an embodiment where one logical unit controls two or more mechanisms is advantageous.

In one embodiment of the sorter the information to and from the logical units are transmitted by means of a radio transmission device and/or an infra red transmission device and/or a signal device transmitting through a power transfer system. Combinations of the above transmission devices may also be employed such as e.g. transmitting general information to all logical unit through the power transfer system and individual information by means of radio signals or infra red signals.

In is advantageous if the logical unit is adapted to perform a self diagnostic of the mechanism. This will allow the central control system of the sorter to obtain information from the logical units and enable it to pinpoint any problems with one or more mechanism and thus ease the maintenance of the system and the mechanisms.

In a preferred embodiment of the sorter each of the tilting mechanisms comprises a device for determining the position of the mechanism and means for communicating the position to the logical unit.

In a preferred embodiment of the sorter each of the tilting mechanisms have propulsion means for driving the sorter along the track part. In general not every mechanism need to have a propulsion means but only a plurality of the mechanisms. This embodiment is especially advantageous in an embodiment where the mechanisms are arranged in trains as described previously.

In a preferred embodiment of the sorter the tracks are inclined in the horizontal curves to tilt the mechanisms for preventing the articles from sliding of the article-supporting surface. This tilt of the curves is advantageous to provide a tilting of the article-supporting surface without tilting the article-supporting part according to the track, alternatively minimises or decrease the tilting of the article-supporting part according to the track. In an embodiment of the invention the tilting of the article-supporting surface in the curves is a combination of a tilted track and the tilting of the mechanism. In a power off situation or a stop situation the mechanism is adjusting the article-supporting surface so that it is horizontal and thus counteracts the tilting of the track.

It is facilitated that the conveying speed of the sorter necessitates the inward tilting to prevent articles carried by the article-supporting means from sliding off the article-supporting means during passage of horizontal curves. The conveying speed may be at least 2 m per second or even of at least 3 m per second. Preferably, the sorter moves at a speed in the range of 3–8 m per second, such as in the range of 3–6 m per second, for example 3–5 m per second.

In a preferred embodiment the track part defines, when projected on a horizontal plane, a closed loop.

The present invention relates according to a separate aspect of the present invention, which aspect may be regarded as an invention in itself, to a sorter comprising a stationary track, movable conveyor means arranged for moving along the track, conveyor drive means for driving the conveyor means along the track, a plurality of tilting mechanisms arranged on the conveyor means, each comprising a frame part being stationary with respect to the conveyor means, a tilting part for supporting an article-supporting part of the sorter, the article-supporting part having an article-supporting surface, tilt drive means for tilting the tilting part of the mechanism in a direction substantially perpendicular to the direction of movement of the sorter, at least one induction station for loading articles onto the article-supporting surfaces, and at least one discharge station for receiving articles being discharged from the article-supporting parts, the sorter further comprising a plurality of control units being arranged on the conveyor means, each control unit controlling the operation of the tilt drive means of at least one of said tilting mechanisms so that each tilt drive means is controlled by one of said control units, the control units being adapted to move the tilting parts to an inclined position of the article-supporting surfaces when passing curves in the horizontal plane of the track so as to prevent articles supported on the article-supporting parts of the tilting parts from sliding off the article-supporting surface in a direction perpendicularly to the direction of movement of the conveyor means, the control units further being adapted to move said article-supporting parts to a substantially horizontal position of the article-supporting surface when passing straight sections of the track.

It is understood that the article-supporting parts may be e.g. trays or cross-belts.

The tilting mechanism may comprises a force measurement device for determining the direction of the resultant force on the tilting part and providing an output accordingly to the respective control unit which is adapted to control said movements of the tilting parts in accordance with said output. The inclination of the article-supporting surfaces in said inclined position is preferably variable so that its actual magnitude is determined by the control units from said output.

Alternatively, the control units each comprises data communication means and the sorter comprises a plurality of signal devices being arranged along the stationary track and each being associated with a curve in the horizontal plane of the track, said data communication means being adapted for detecting a signal device and induce the control unit to initiate inclination of the article-supporting surface accordingly. The communication means are advantageously adapted for wireless communication in which case said signal devices each comprises an emitter for providing a wireless signal to said communication means. The wireless signal may be of plurality of known types, such as radio waves or sound waves, but it is preferred to use light waves, and it is particularly preferred that the emitter is an infra red light source.

It is furthermore advantageous that the signal device provides an indication to said communication means of the direction of turn of the curve associated therewith.

In addition, the control units may be adapted to move the tilting parts to an inclined position of the article-supporting surfaces when passing said curves only on the condition that an article is present on the article-supporting surface so as to avoid unnecessary wear of the tilting mechanism. For this purpose, the control unit may be given the knowledge of whether an article is present e.g. at the induction station and the discharge station(s) but according to an alternative embodiment, at least one detection device is arranged along the stationary track, the detection device comprising article detection means for detecting the presence of articles on the article-supporting surfaces and signal means for providing an output accordingly to communication means of the respective control units. The communication means are preferably adapted for wireless communication and said signal means comprises an emitter for providing the output as a wireless signal to said communication means. In particular, said emitter may be an infra red light source.

In order to enable the sorter to run a different speeds, it is advantageous that the inclination of the article-supporting surfaces in said inclined position is variable and its actual magnitude is determined by the control units from the conveying speed of the conveyor means and/or from the weight of the article and/or the geometry of the article or other physical characteristics of the article. Furthermore, the speed with which the tilt drive means moves the tilting part to discharge articles at the at least one discharge station may also be variable and is determined by the control unit from the conveying speed of the conveyor means. It is in this respect also advantageous that in case the at least one induction station loads articles onto the article-supporting surfaces with a velocity component of the article in a direction perpendicularly to the direction of movement of the conveyor means, the control units is adapted to move the tilting parts to an inclined position of the article-supporting surfaces when articles are loaded onto the article-supporting surfaces so as to prevent the articles from sliding off the article-supporting surface in the direction of said velocity component. The induction station is typically arranged as a belt conveyor next to the conveyor means with an angle between the conveying directions of about 30 degrees. The articles to be loaded onto the article-supporting surfaces are accelerated so that they have a velocity component in the conveying direction of the conveyor means of a magnitude substantially equal to the conveying speed of the conveyor means. Thereby, a velocity component in the direction perpendicular to the conveying direction of the conveyor means is created, and experience has shown that the articles tend to slide off the article-supporting surfaces of the tilt trays if this velocity component exceeds 1–1.2 meters per second which thereby limits the speed of the conveyor means. With increased speed of the conveyor means, the angle between the induction conveyor and the conveyor means can be reduced to reduce the magnitude of the perpendicular component but such a solution is area-consuming. The above-described solution of inclining the article-supporting surface when articles are loaded onto them solves this problem in an advantageous manner and allows much higher speed of the conveyor means than ordinary tilt tray conveyors. The inclination of the article-supporting surfaces in said inclined position is preferably variable and its actual magnitude is determined by the control units from the conveying speed of the conveyor means.

The control unit may comprise a sensor or other device, such as a tachometer on a wheel running along the stationary track, for providing the control unit with a measure or indication of the speed of the conveyor means. Alternatively, at least one speed indication device is arranged along the stationary track and comprising speed indication means for providing an output indicative of the conveying speed of the conveyor means to communication means of the respective control units.

The conveying speed of the conveyor means is preferably within the ranges given previously. The tilting mechanism for the sorter is preferably the previously described tilting mechanism.

The control units may be adapted to control the speed of the tilting movement during discharge of an article according to a predetermined discharge profile. The discharge profile may be determined individually from the weight of the article, from the conveying speed of the sorter, from the geometry of the article or from a combination of factors. The determination of the discharge profile may also depend on whether the article-supporting part supports the article solely or, in case two or more adjacent article-supporting parts supporting the same article, from its position among these parts.

The control units may also be adapted to control the tilting mechanisms to move articles supported on the respective article-supporting parts to the middle in the transversal direction of the articles-supporting surfaces and/or to move articles supported on the respective article-supporting parts to an edge in the transversal direction of the articles-supporting surfaces.

Such a movement of the articles could be performed by shaking the mechanism in a predetermined pattern making fast tilts from side to side.

The control of the tilting mechanisms and the discharge mechanisms of the above-described sorters may also include control for induction of articles onto the article-supporting surfaces and discharge of articles from the surfaces during passage of horizontal curves of the track.

The sorters may comprise carriages coupled together on which one or more tilting mechanisms each having an article-supporting member is arranged. Two or more mechanisms on the same carriage is advantageous if articles are to be supported by more than one article-supporting member because the members supported on the same carriage does not have mutual movements during passage of horizontal or vertical curves of the track. Also, the carriages of the sorter does not necessarily all have the same length in the conveying direction of the sorter or have the same number of mechanisms arranged.

The sorters may be so-called line sorters or slat sorters in which the individual article-supporting surfaces are formed as slats extending transversally to the conveying direction of the sorter and the articles are supported by a plurality of such slats that may be tilted individually.

The sorters may alternatively have the track part arranged so that the carriages are supported at one side instead of as usually from below. Such sorters may have an over-under configuration in which discharge stations may be arranged stacked in the vertical direction, the track part comprises vertical end turns which shift the conveying direction of the carriages and the vertical level in which they moves, and the sorter comprises means for maintaining the horizontal position of the article-supporting surfaces during passage of the end turns.

It is obvious to the skilled person that the features of the different embodiments of sorters and of the tilting mechanism described herein can according to the invention be combined in any advantageous manner.

DESCRIPTION OF THE FIGURES

Examples of the embodiments of the present invention will now be further described with references to the drawing in which:

FIG. 1 is an end view of the mechanism and in this figure parts are removed to make it possible to see the non-linear path 1 in which a smooth wheel 2 runs, the mechanism is shown in a non-tilted position and the smooth wheel 2 is resting on a part 3 of the path 1 that has the same diameter as the wheel 2.

Figure 1:
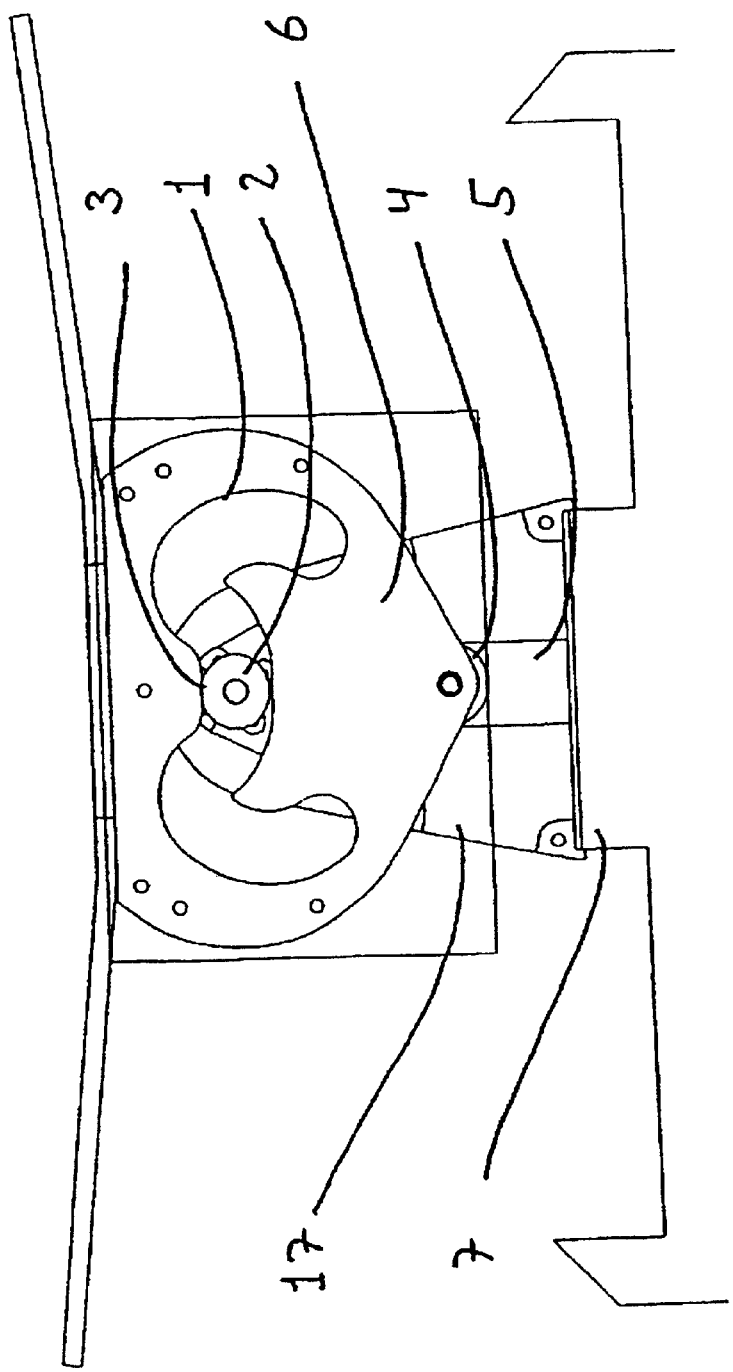
FIGS. 1–5 show a sequence of a tilt of a first embodiment of the mechanism starting from a non-tilted position to a full tilted position.

The smooth wheel 4 that runs in the linear path 5 is placed on the tilting part 6, as well as the tray, and the linear path 5 is placed on the frame part 7, if this figure was made from the opposite side of the mechanism it would have the exact same appearance.

The non-linear path 1 and the linear path 5 are formed as slots or grooves in the tilting part 6 and the motor and gear housing 17 of the frame part 7, respectively.

The non-linear path 1 is here shaped so that when the drive wheel 15 is in a predetermined position on the non-linear path 1, any rotation movement of said drive wheel will cause the centre of gravity of the tilting part 6 to move in an upwards direction. This will cause the movement of the tilting part 6 to be braked as kinetic energy is transformed into potential energy when the tilting part 6 is moving from a generally non-tilted position as in FIG. 1 to a full tilted position as in FIG. 5.

In this way the tilting of the tilting part 6 is helped by gravity in the first part of the tilt and the braking or stopping of the tilt is helped by gravity in the last part of the tilt.

Also the non-linear path 1 could be shaped so that when the drive wheel 15 is in a predetermined position, any rotating movement of the drive wheel 15 will cause the tilting part 6 to rotate in the same direction towards being in a non-tilted position. This shape of the non-linear path i will cause the time of discharge of the articles to be equalised.

Figure 2:
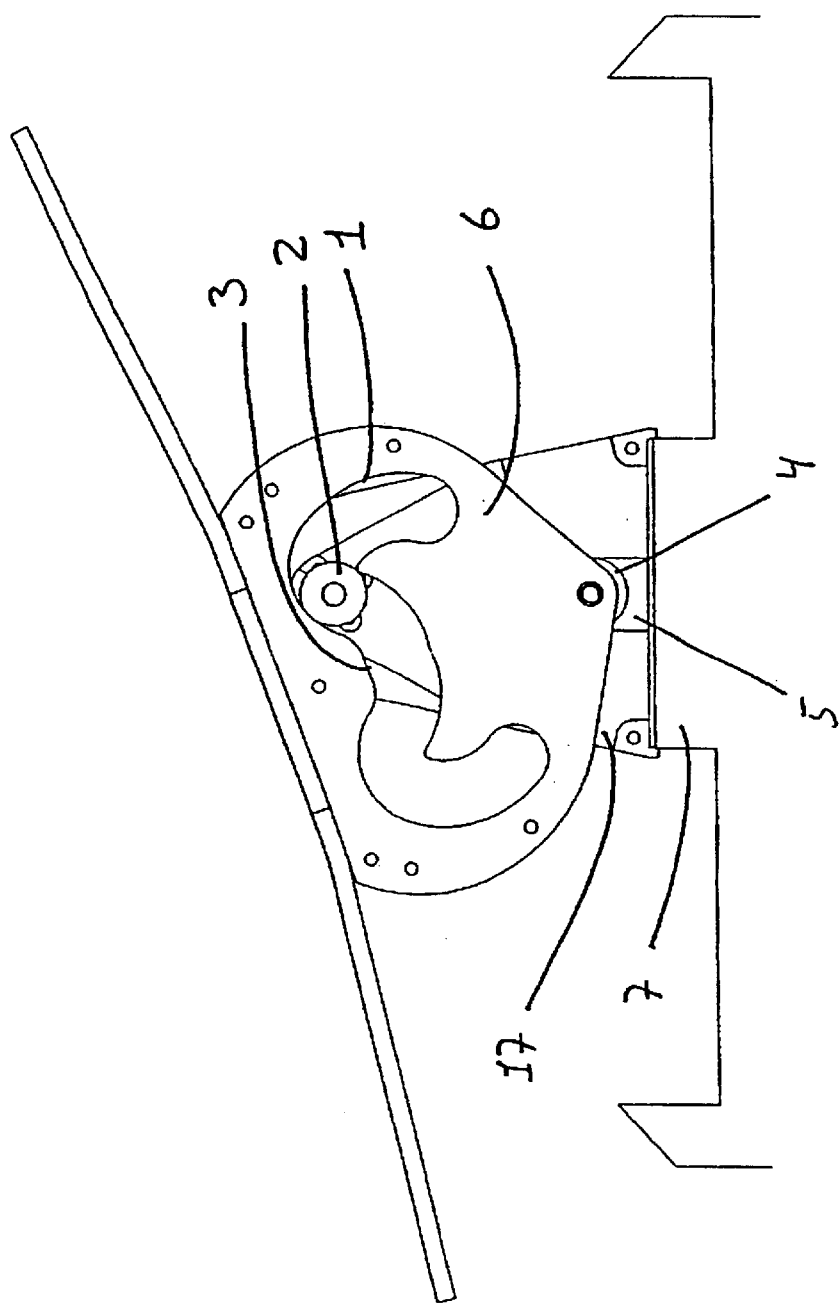

FIG. 2 is the same view as FIG. 1, but here the tilting part 6 is slightly tilted compared with the position in FIG. 1. The smooth wheel 4 is now at a lower position than in the non-tilted position in FIG. 1.

FIG. 3 is again the same view as in FIGS. 1 and 2 in which the tilting part 6 is in a position characterised in that the smooth wheel 4 now is at its minimum height.

Figure 3:
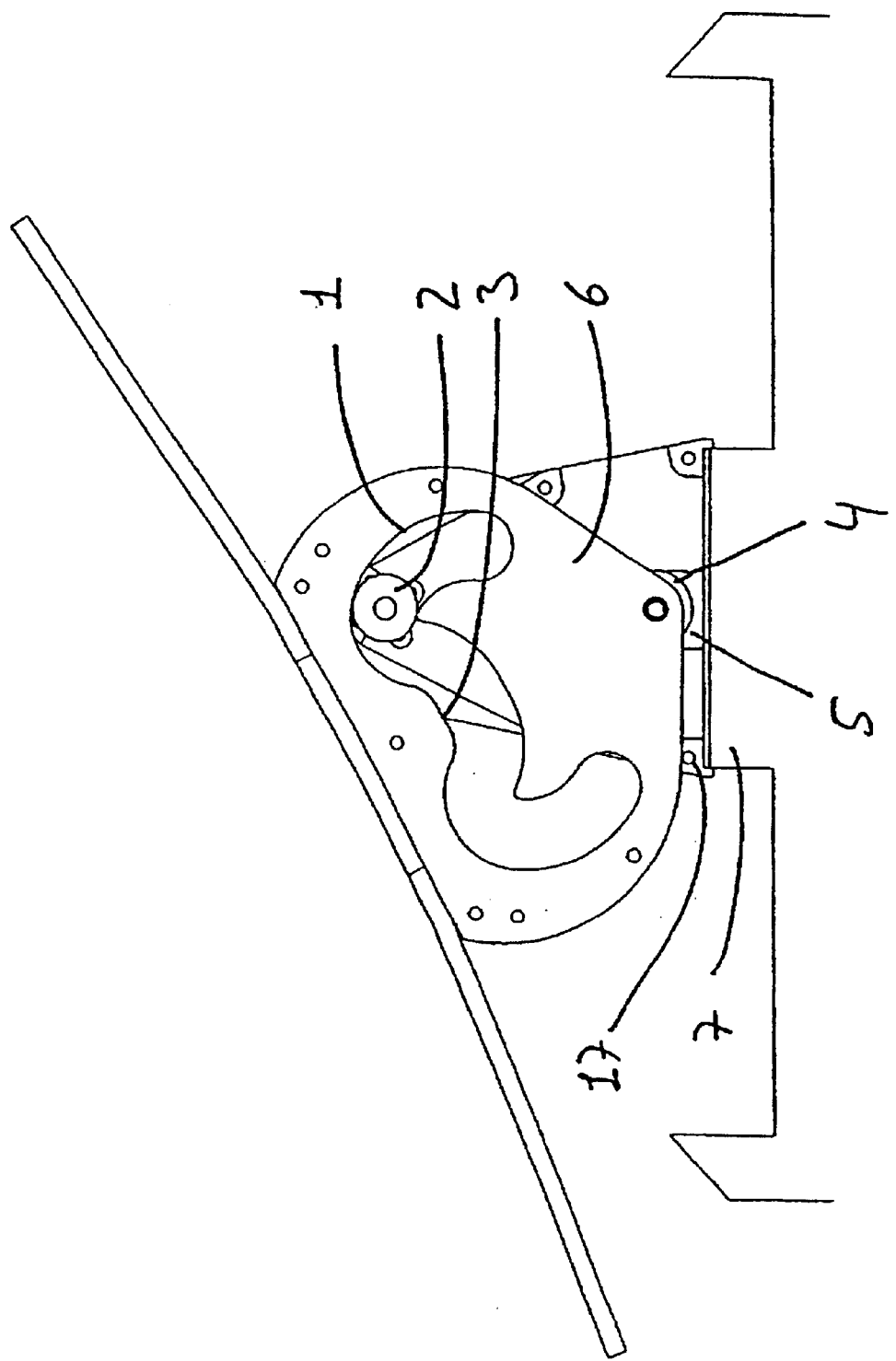
Figure 4:
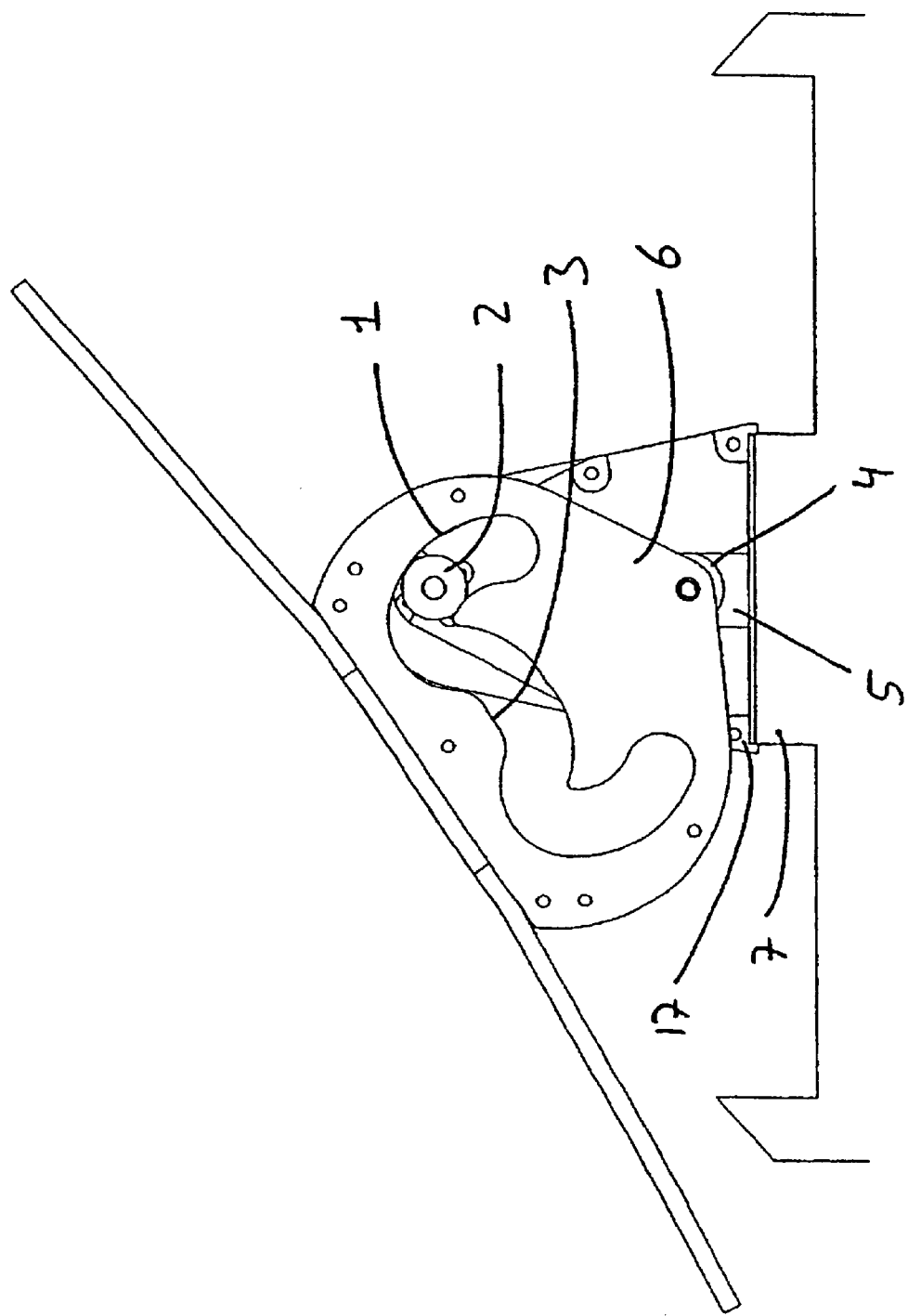

FIG. 4 is yet again the same view as FIGS. 1–3. In FIG. 4 the smooth wheel 4 is on its way upward again.

Figure 5:
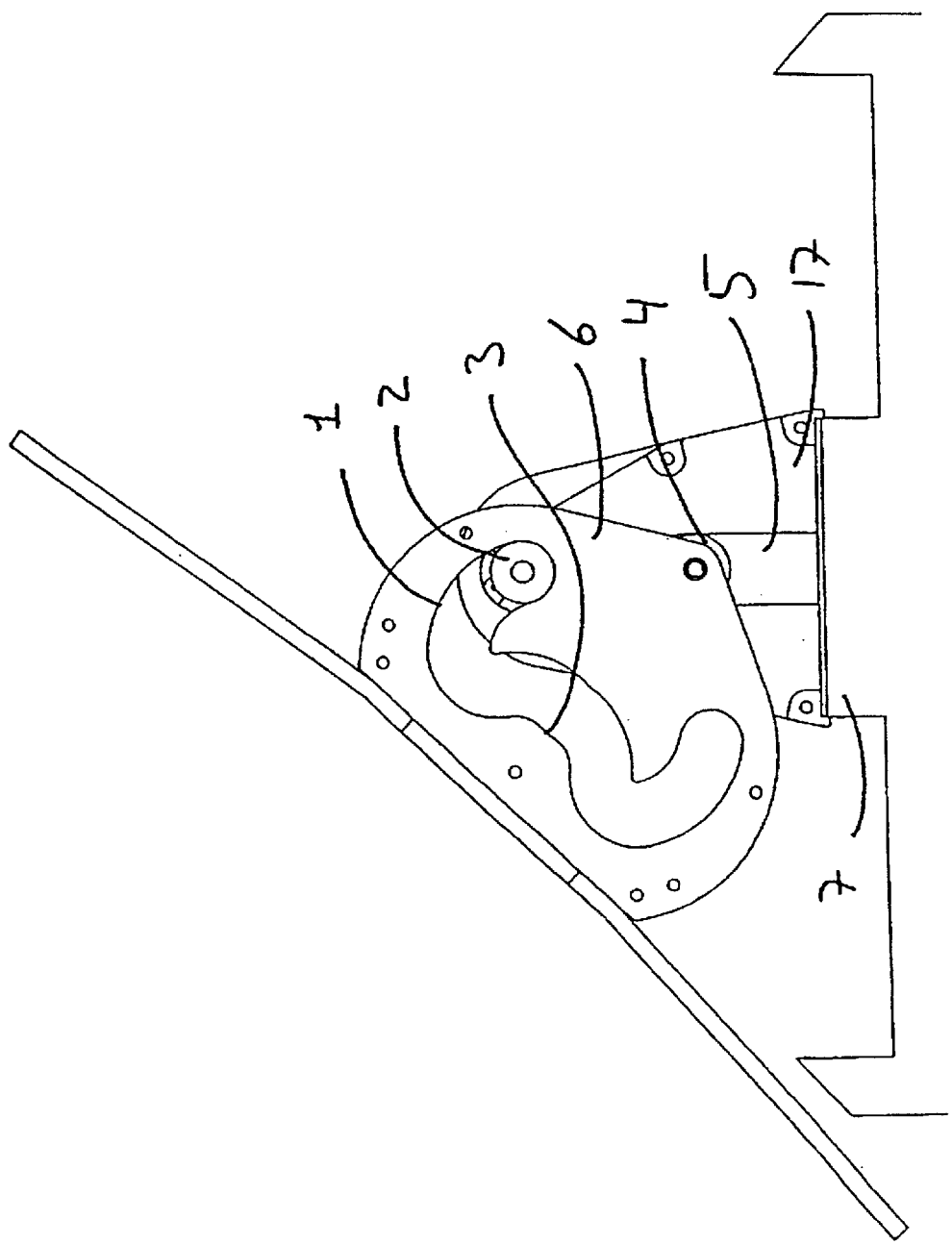

FIG. 5 is still the same view as FIGS. 1–4. In FIG. 5 the tilting has come to the outer extreme position in which the tray is fully tilted so as to discharge an article supported thereon, the smooth wheel 4 is, as it was in the beginning of the tilting operation, in the top of its path 5.

Figure 6:
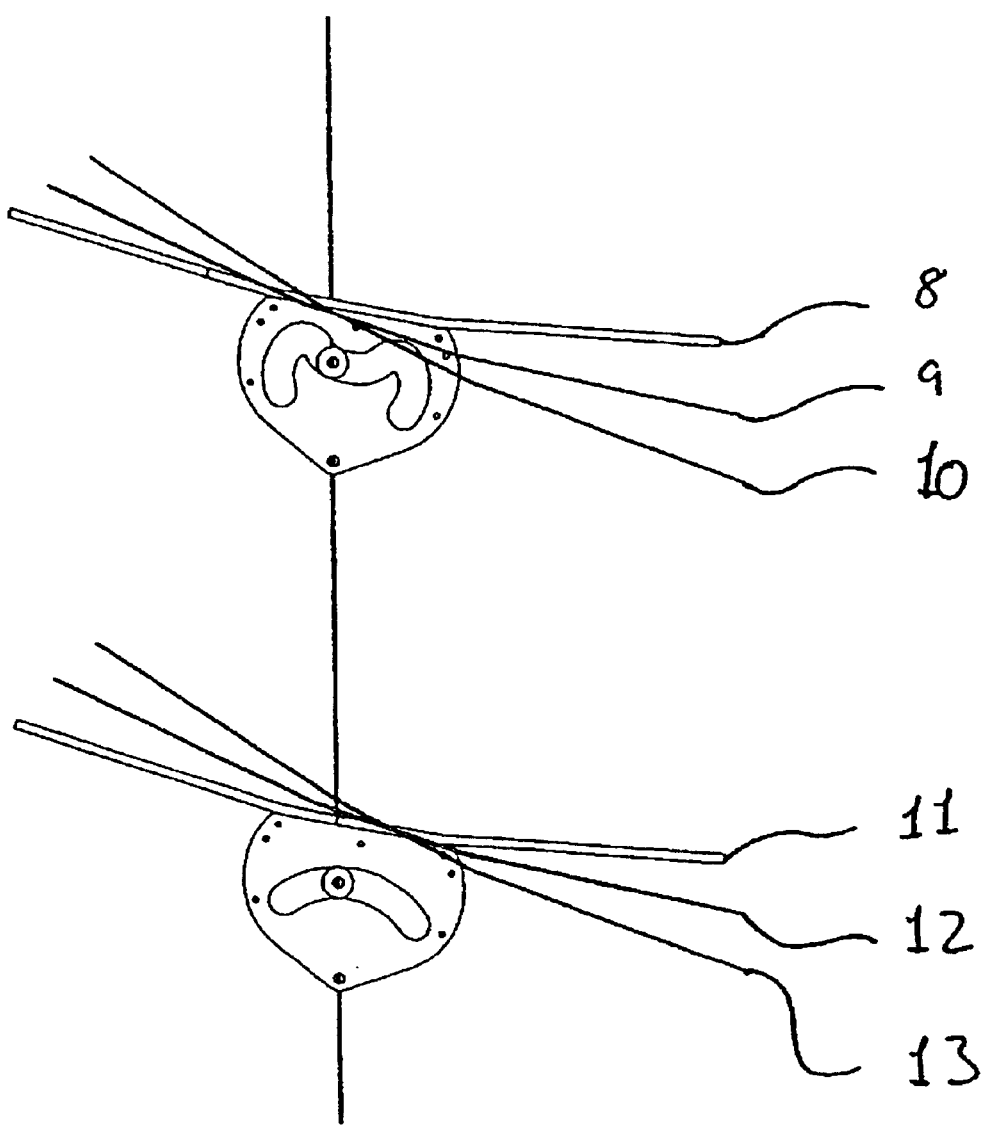
FIG. 6 is a comparison between a normal tilt with a stationary axis of rotation and the present invention, the figure showing three stages of each tilt.

In FIG. 6 two tilting mechanisms are compared, the present embodiment of the invention is shown at the top in three tilting positions 8, 9 and 10 and for comparison a stationary rotation point mechanism is shown at the bottom in three similar tilting positions 11,12,13. When the two set of positions are compared the stationary rotation point mechanism is lifting the tray 22 in one side and lower it in the other, the lift and the lowering being of similar magnitude. The present embodiment of the invention is lowering one side of the tray 22 significantly more than the other side is lifted so that the common centre of gravity of the tray 22 and an article supported on the tray 22 is not lifted or only lifted slightly during the tilting process, thus demanding less work performed by the drive means for tilting the tray 22.

Figure 7:
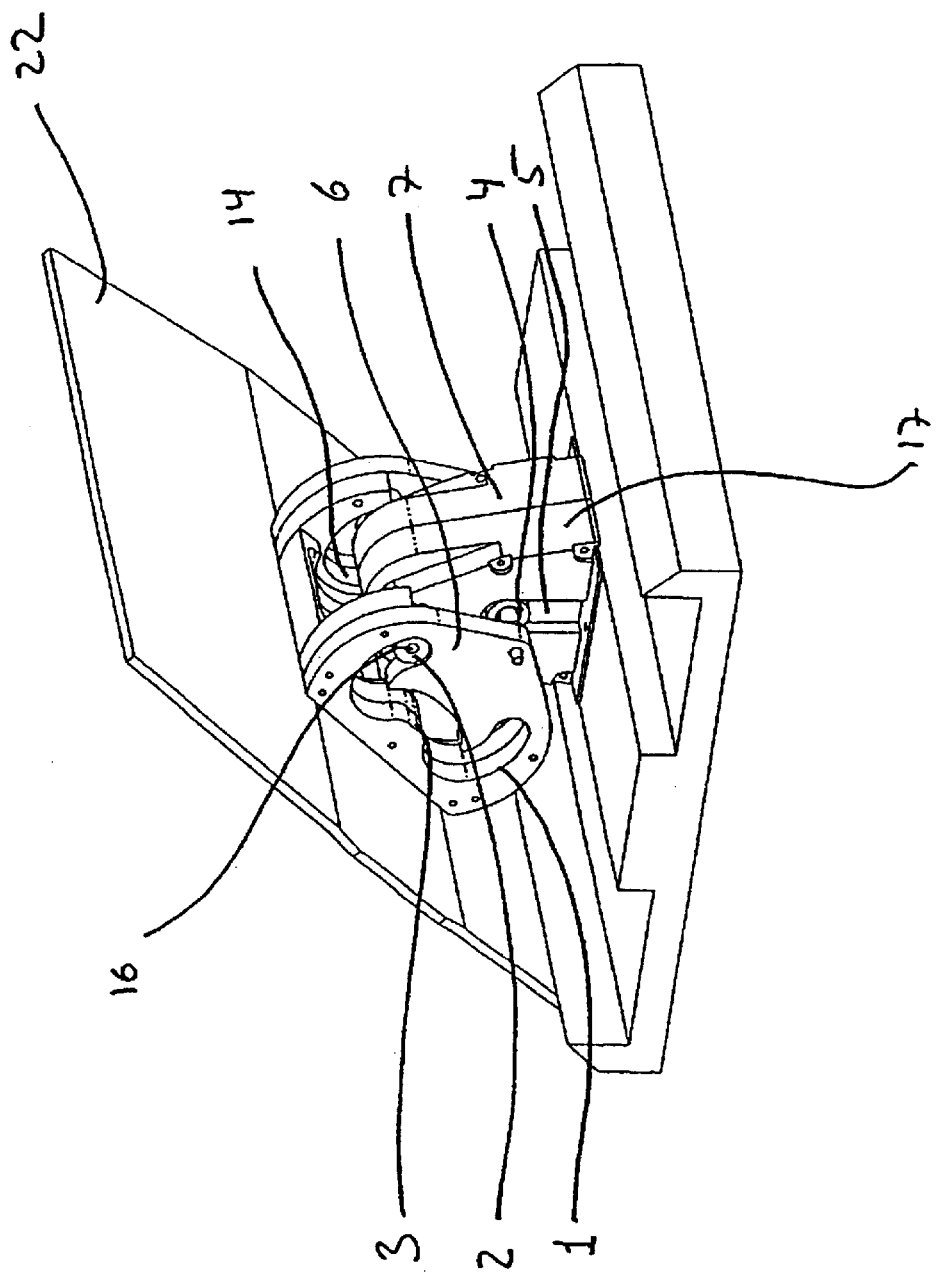
FIG. 7 is a perspective view of the first embodiment of the present invention in a full tilted position.

FIG. 7 shows how the mechanism of the present embodiment is arranged, the smooth non-linear slot (path) 1 is right in front of the toothed non-linear slot (path) 14. In the position shown, the mechanism and the tray 22 is fully tilted to the extreme position to one side, the smooth wheel 2 is at the end of the non-linear path 1 as well as the pinion 15 behind the smooth wheel 2 as the pinion 15 and the smooth wheel 2 is placed on the same axle 16.

On the frame part 7 is placed a motor and gear housing 17, wherein an electrical step by step motor and a gear are placed, the motor and gear housing 17 integrating the linear path 5.

Figure 8:
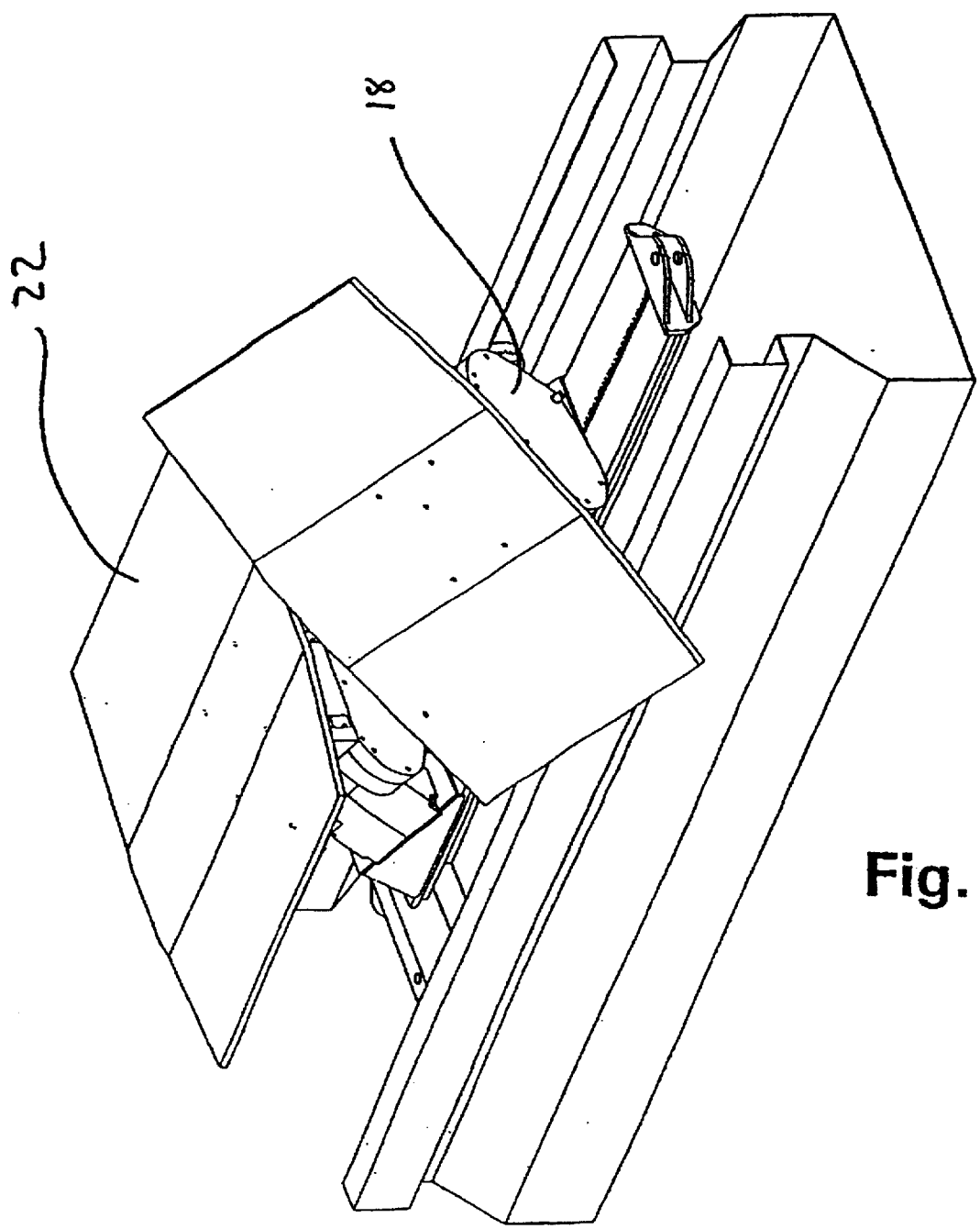
FIGS. 8–13 are perspective views of the first embodiment of the present invention both in a full tilted position and in a non-tilted position.
Figure 9:
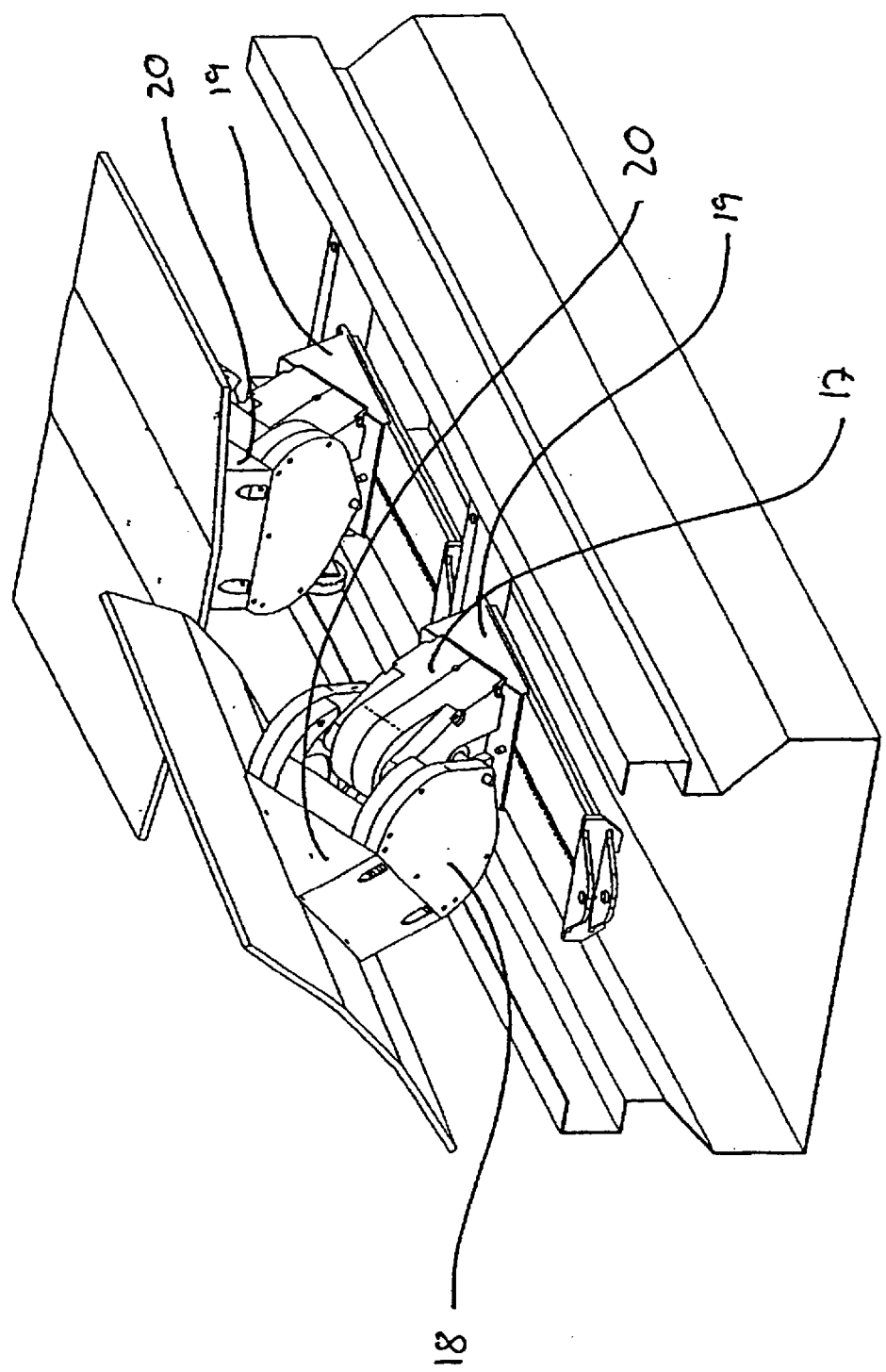

FIGS. 8 and 9 show an alternative embodiment of the present invention from two different angles where the end protection plates 18 are placed on the tilting part 6. This embodiment includes angling attachments 19, 20. One angling attachment 19 is placed between the motor and gear housing 17 and the trolley frame 21, another is placed between the tilting part 6 and the tray 22. This configuration will cause the tilt operation to be a "3D tilt" so that the tray 22 is tilted towards the side of the sorter as well as in the transport direction of the sorter is as it is illustrated in the figures.

Figure 10:
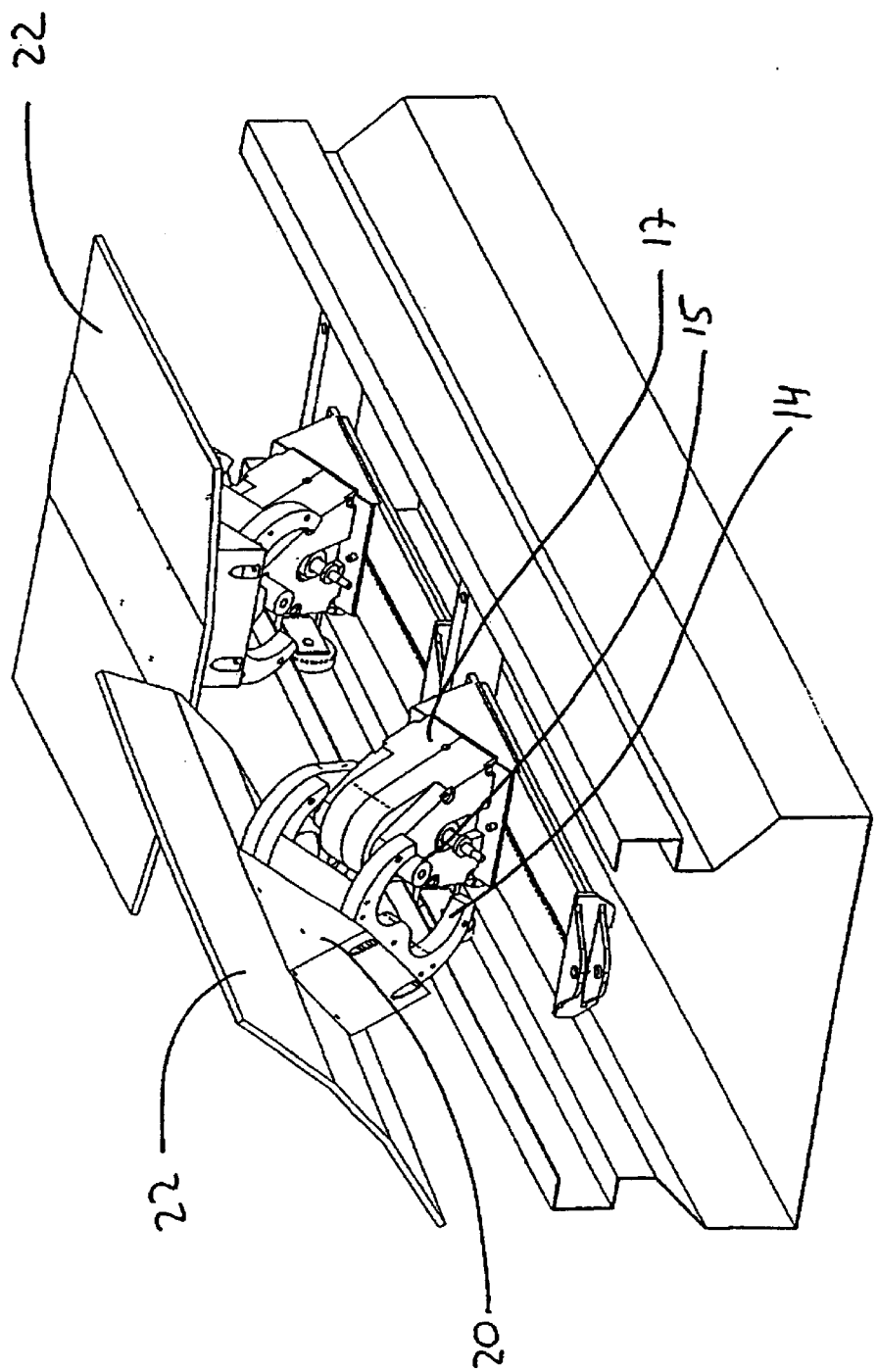

FIG. 10 illustrates where the toothed non-linear rim 14 is placed, the end protection plate 18, the smooth nonlinear rim, the smooth wheels 2, 4, and the pinion 15 being removed.

Figure 11:
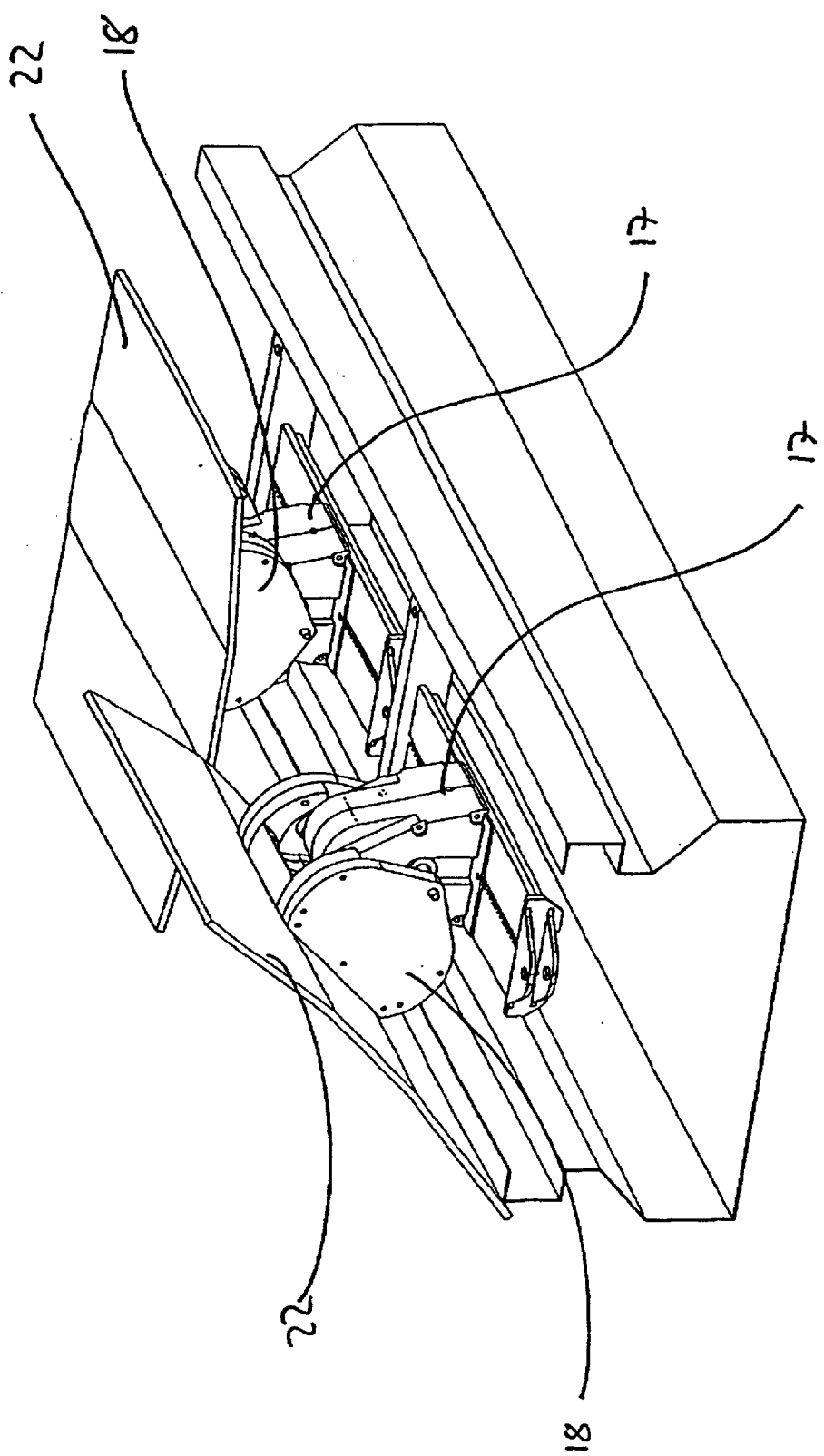
Figure 12:
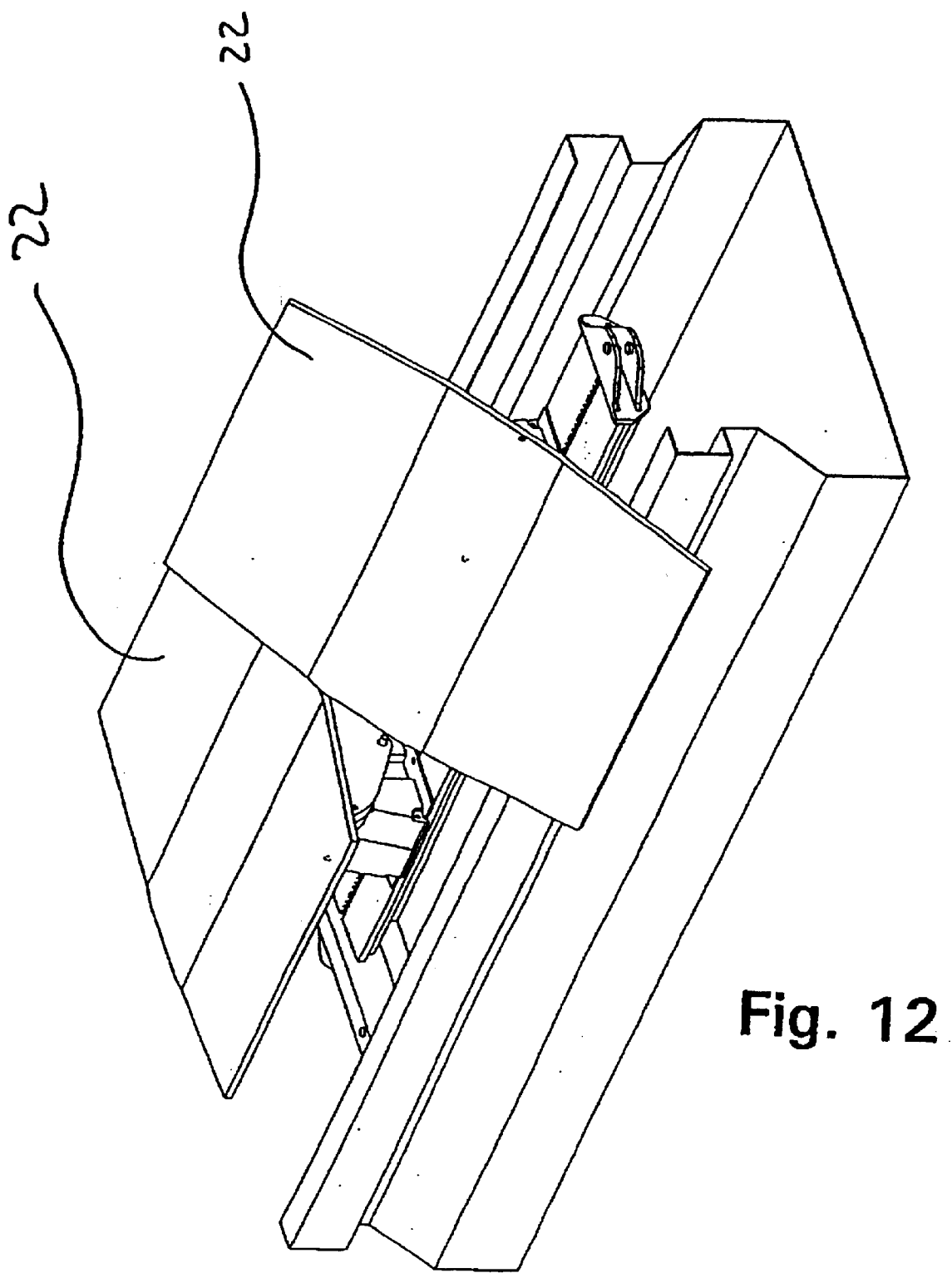

FIGS. 11 and 12 show the same view of the mechanism as FIGS. 8 and 9, only on these figures the motor and gear housing 17 are placed directly on the trolley frame 21 and the tray 22 is placed directly on the tilting part 6.

Figure 13:
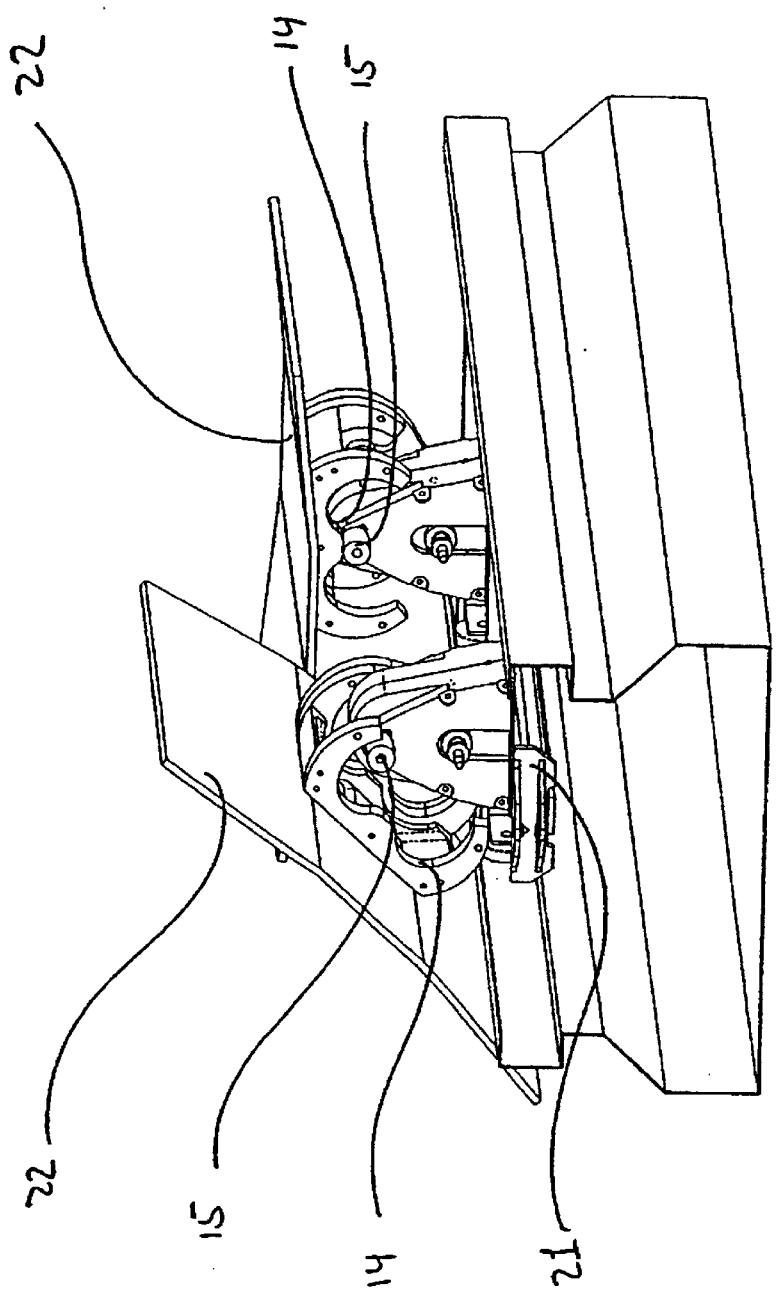

FIG. 13 shows the same view of the mechanism as FIG. 10, only on this figure the motor and gear housing 17 is placed directly on the trolley frame 21 and the tray 22 is placed directly on the tilting part 6.

Figure 14:
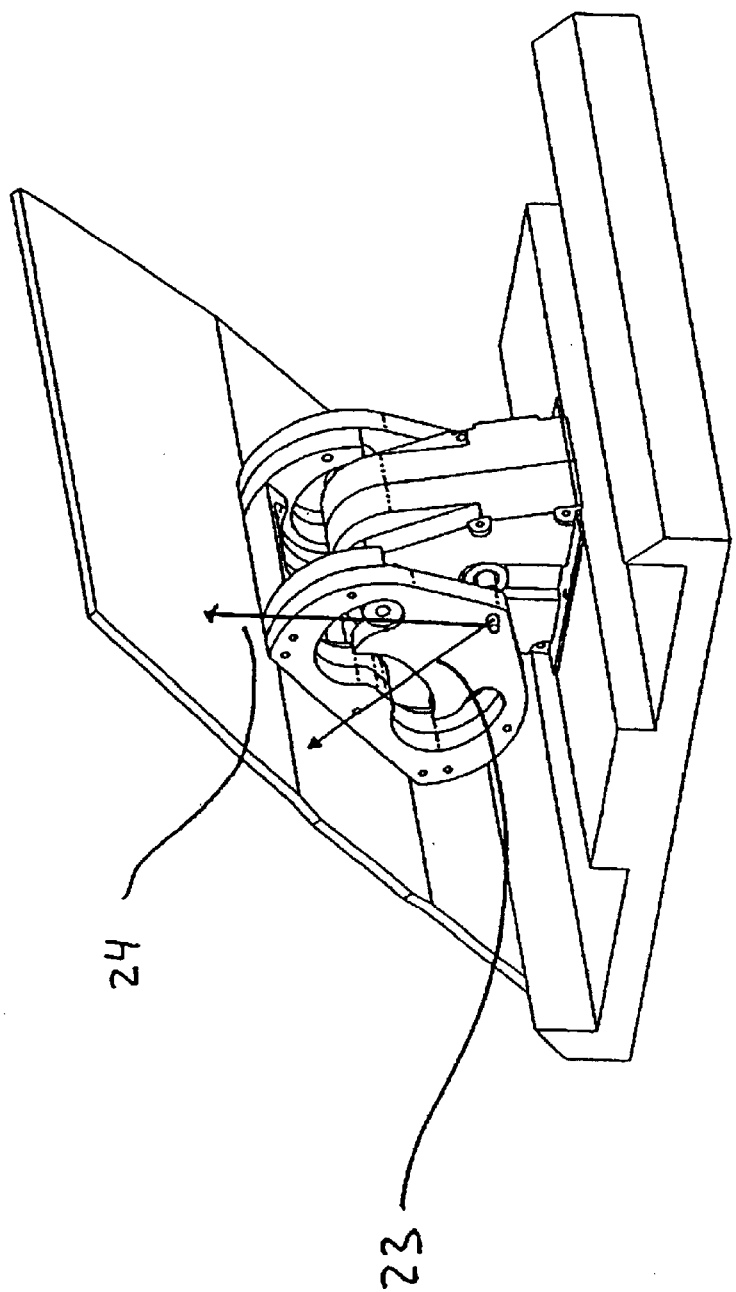
FIGS. 14–16 are perspective views of the present invention showing the main direction of the frame part and the main direction of the tilting part.
Figure 15:
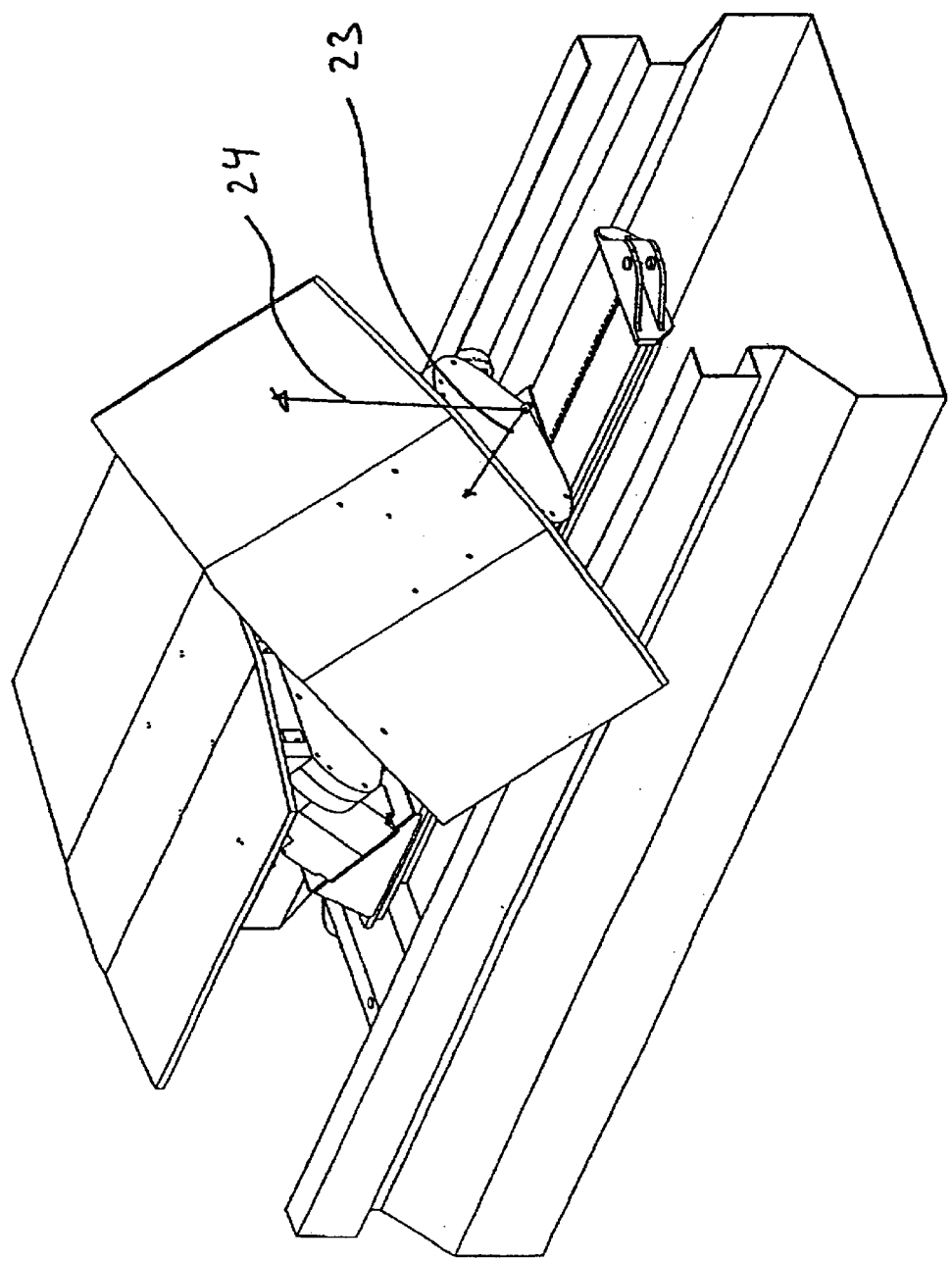
Figure 16:
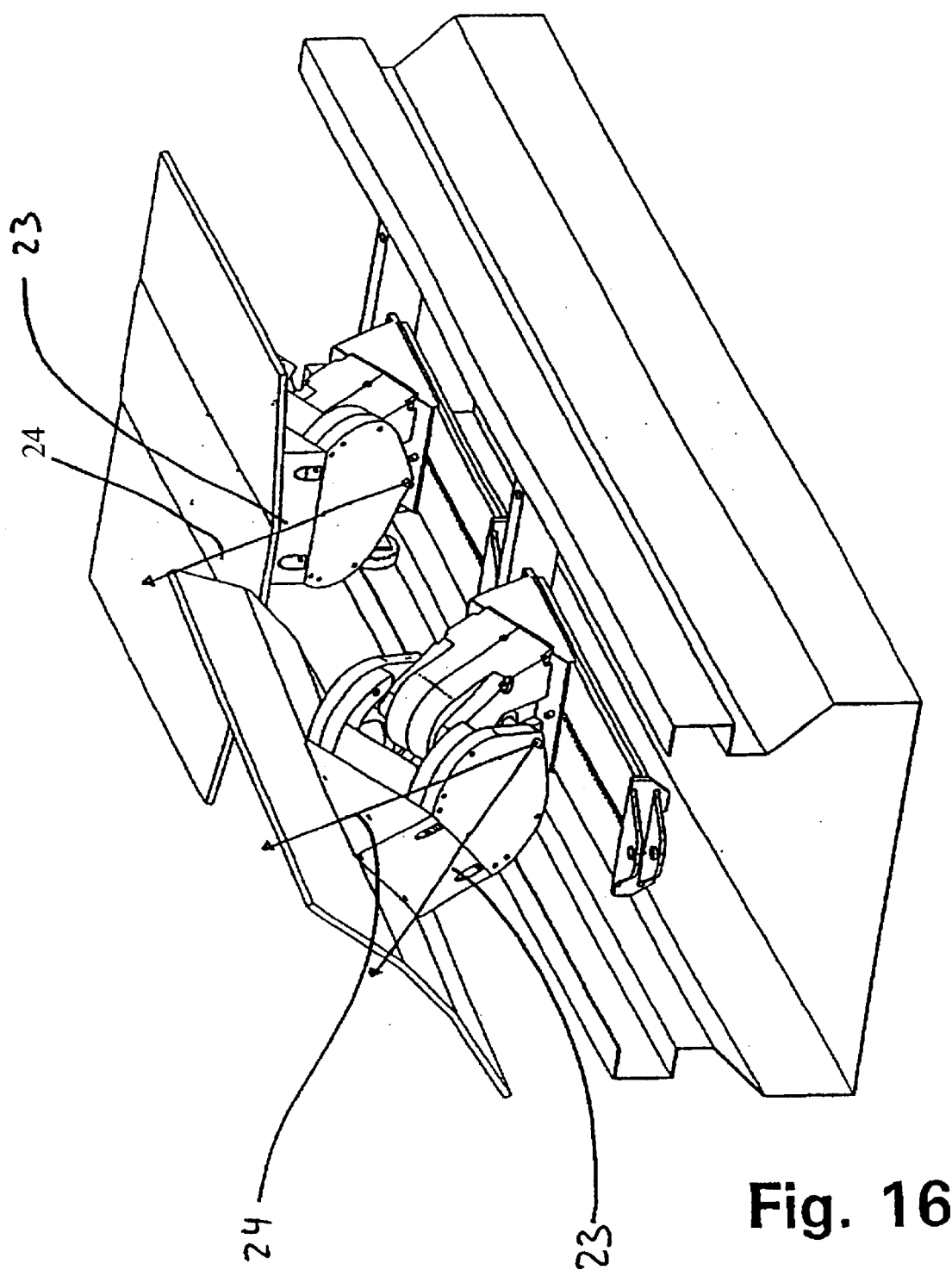

FIGS. 14–16 illustrate the position of the main direction vectors of the tilting part 6 and the frame part 7. The tilting part 6 main direction 23 having the tilting part 6 as its initial system, and the frame part 7 main direction 24 having the frame part 7 as its initial system.

FIGS. 17–21 illustrate an end view of a second embodiment of the mechanism according to the present invention. In these figures parts are removed to make it possible to see the non-linear path 1 in which a smooth wheel 2 runs, the mechanism being shown in a non-tilted position and the smooth wheel 2 is resting on a part 3 of the path 1 that has the same diameter as the wheel 2.

The smooth wheel 4 that runs in the linear path 5 is placed on the tilting part 6, as well as the tray, and the linear path 5 is placed on the frame part 7, and if this figure was seen from the opposite side of the mechanism, it would have the exact same appearance.

The non-linear path 1 and the linear path 5 are formed as slots or grooves in the tilting part 6 and the motor and gear housing 17 of the frame part 7, respectively.

Figure 17:
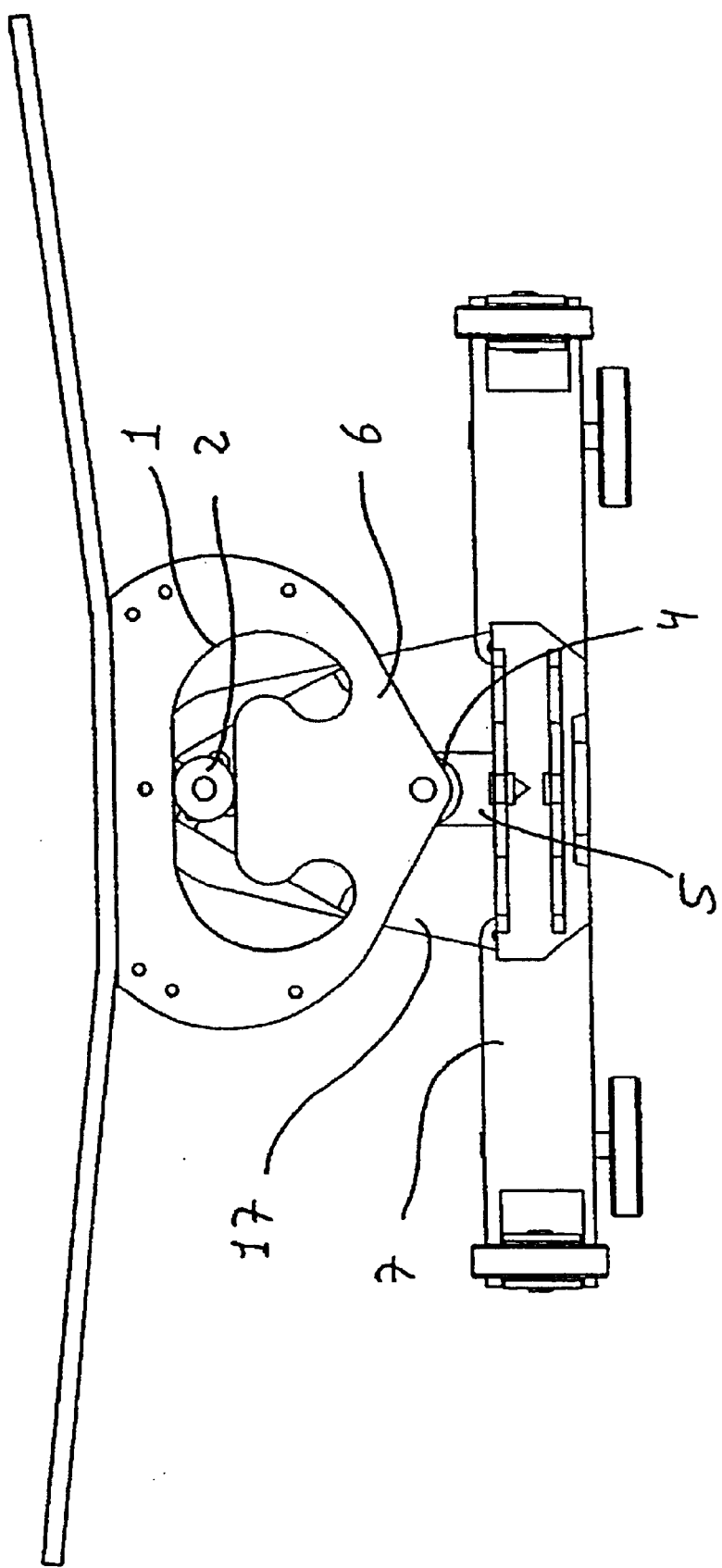
FIGS. 17–21 are front views similar to FIGS. 1–5 of a second embodiment of the tilting mechanism with a different non-linear path, the figures showing the tilt in a 10,20,30 and 45 degree tilt angle.
Figure 18:
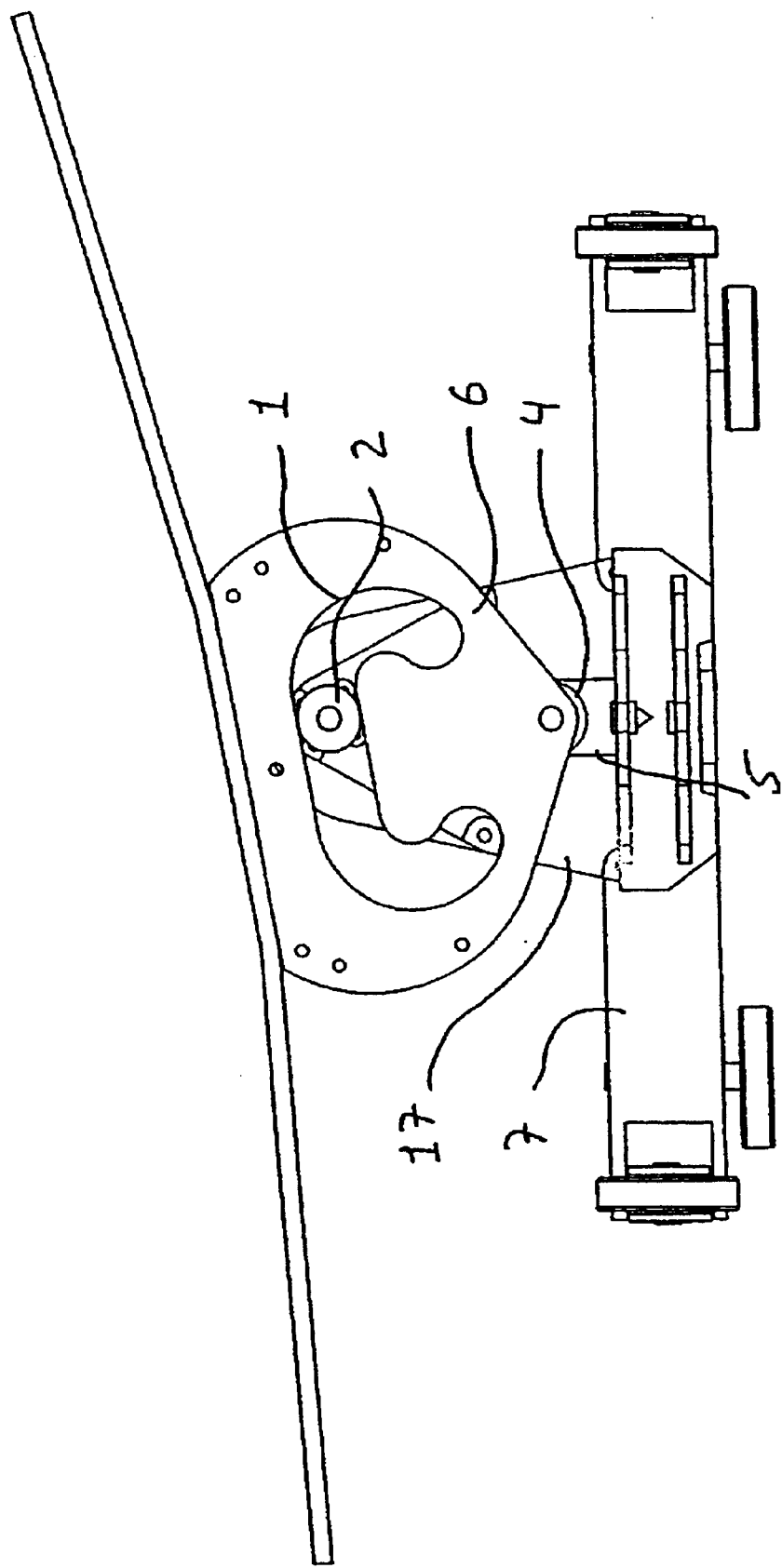
Figure 19:
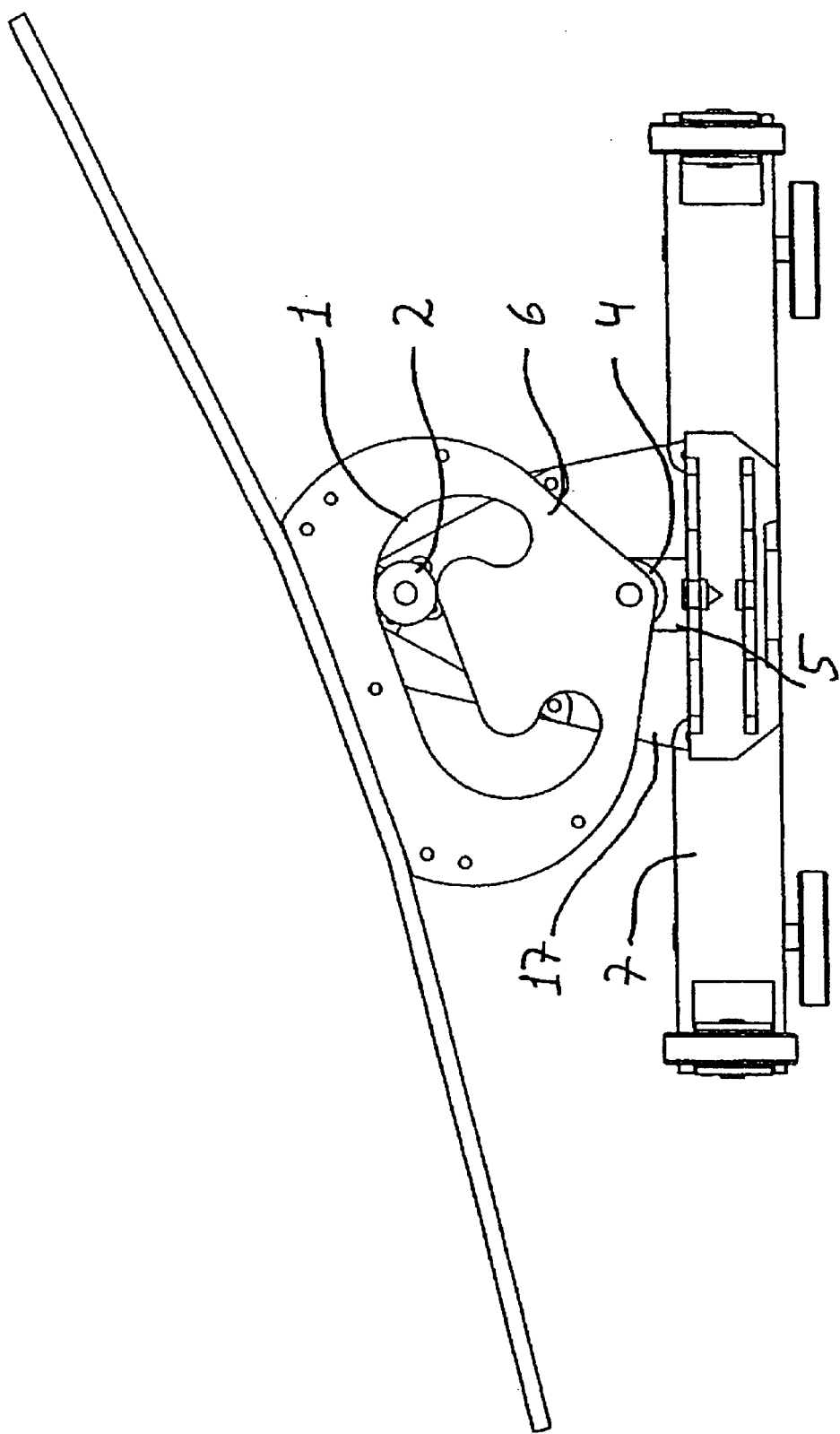
Figure 20:
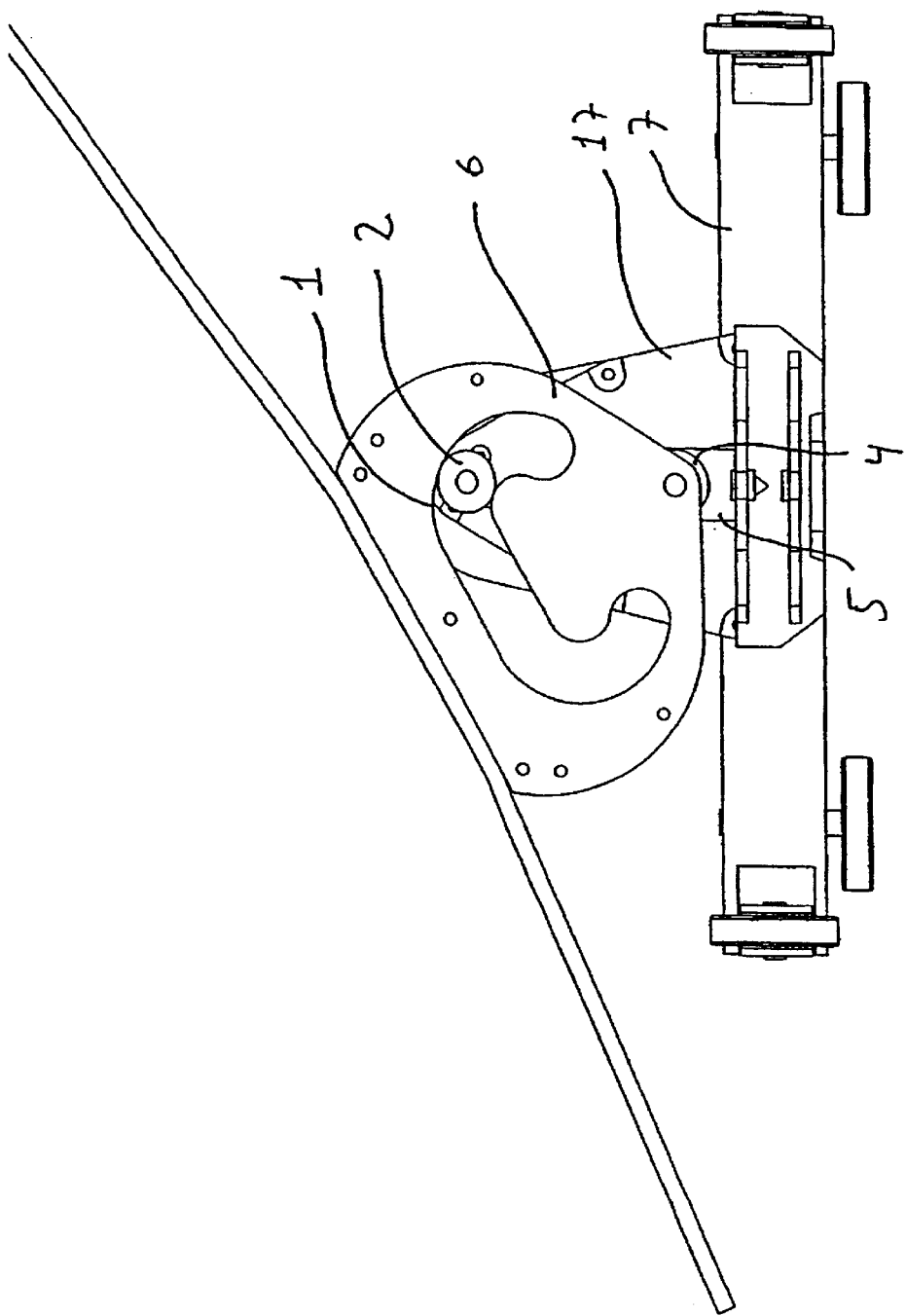
Figure 21:
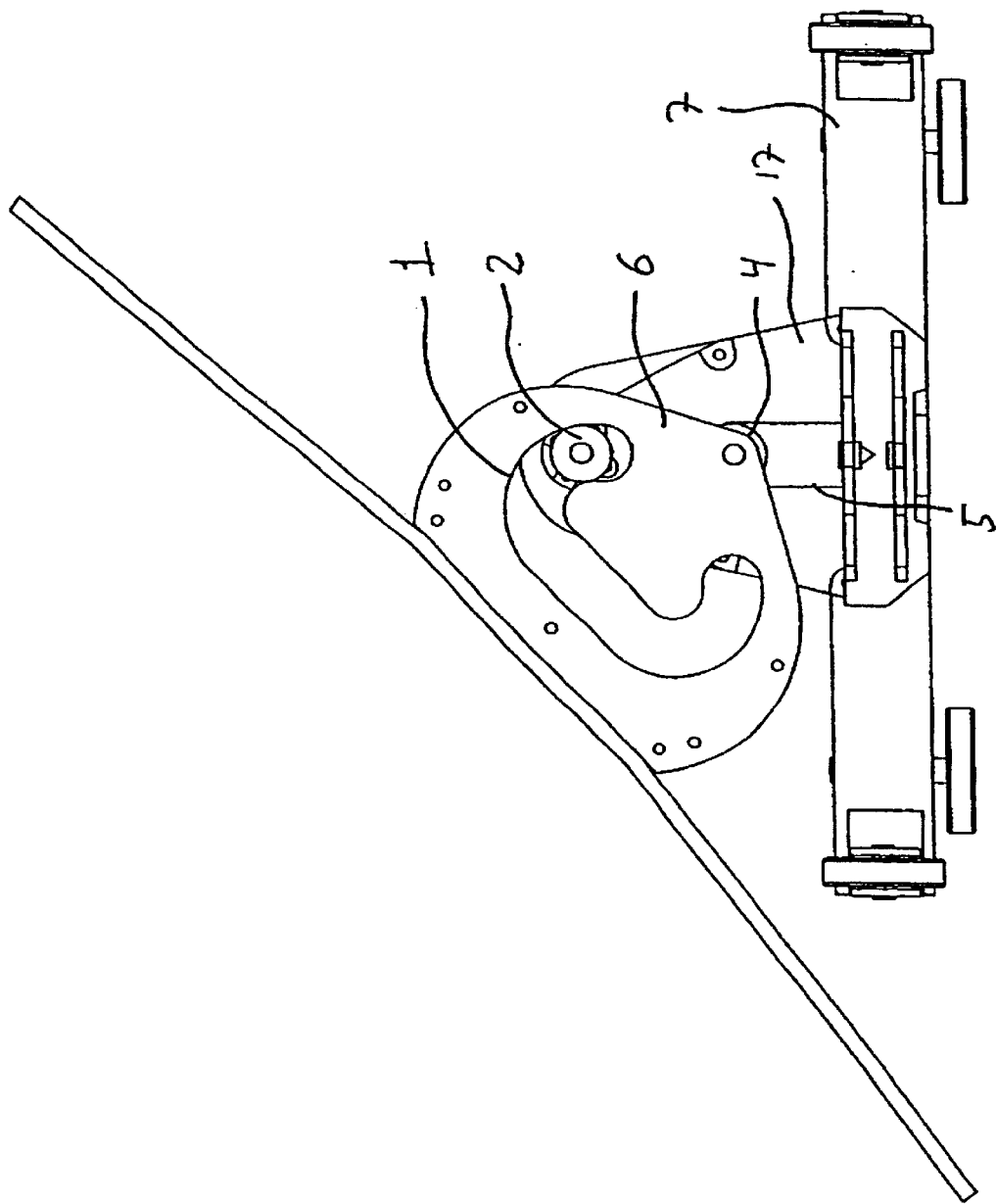

The non-linear path is shaped so that when the tilting part is in a maximum tilt position any tilting movement, increasing or decreasing the tilting angle, will cause the centre of gravity of the tilting part including the article-supporting part and optionally an article supported by the article-supporting part to move in a direction having a positive component in the main direction of the frame part. The figures show the tilting mechanism in different tilting angles starting with FIG. 17 showing the mechanism in a non-tilted position and the following figures show the mechanism in 10°, 20° and 30° and FIG. 21 in 45° respectively.

This embodiment of the invention has a point where the vertical movement of the centre of gravity is shifted from a direction downwards to upwards that is at a relatively small angle such as 17° whereas the first embodiment has a later turning point. This early turning point makes the tilt brake at an early state so as to minimise the braking power needed. Also, this shape of the non-linear path has a rotation turning point where the rotation of the tilting part shifts from being in one direction to an other and in this point any rotation of the drive wheel will cause the tilting rotation to go in a direction towards being in a non-tilted position.

A list of the reference numerals using in the FIGS. is given below.

1 non-linear path
2 smooth wheel non-linear path
3 rest part of the path
4 smooth wheel linear path
5 linear path
6 tilting part
7 frame part
8 present invention pos. 1
9 present invention pos. 2
10 present invention pos. 3
11 stationary rotation point pos. 1
12 stationary rotation point pos. 2
13 stationary rotation point pos. 3
14 toothed non-linear rim
15 drive wheel
16 axle
17 motor and gear housing
18 end protection plates
19 angling attachments 1
20 angling attachments 2
21 trolley frame
22 tray
23 vector of the tilting part
24 vector of the frame part

What is claimed is:

1. A sorter comprising a stationary track, movable conveyor means arranged for moving along the track, conveyor drive means for driving the conveyor means along the track, a plurality of tilting mechanisms arranged on the conveyor means, each comprising a frame part being stationary with respect to the conveyor means, a tilting part for supporting an article-supporting part of the sorter, the article-supporting part having an article-supporting surface, tilt drive means for tilting the tilting part of the mechanism in a direction substantially perpendicular to the direction of movement of the sorter, at least one induction station for loading articles onto the article-supporting surfaces, and at least one discharge station for receiving articles being discharged from the article-supporting parts, the sorter further comprising a plurality of control units being arranged on the conveyor means, each control unit controlling the operation of the tilt drive means of at least one of said tilting mechanisms so that each tilt drive means is controlled by one of said control units, the control units being adapted to move the tilting parts to an inclined position of the article-supporting surfaces when passing curves in the horizontal plane of the track so as to prevent articles supported on the article-supporting parts of the tilting parts from sliding off the article-supporting surface in a direction perpendicularly to the direction of movement of the conveyor means, the control units further being adapted to move said article-supporting parts to a substantially horizontal position of the article-supporting surface when passing straight sections of the track.

2. A sorter according to claim 1, wherein the tilting mechanism comprises a force measurement device for determining the direction of the resultant force on the tilting part and providing an output accordingly to the respective control unit which is adapted to control said movements of the tilting parts in accordance with said output.

3. A sorter according to claim 2, wherein the inclination of the article-supporting surfaces in said inclined position is variable and its actual magnitude is determined by the control units from said output.

4. A sorter according to claims 1, wherein the control units each comprises data communication means and the sorter comprises a plurality of signal devices being arranged along the stationary track and each being associated with a curve in the horizontal plane of the track, said data communication means being adapted for detecting a signal device and induce the control unit to initiate inclination of the article-supporting surface accordingly.

5. A sorter according to claim 4, wherein said communication means are adapted for wireless communication and said signal devices each comprises an emitter for providing a wireless signal to said communication means.

6. A sorter according to claim 5, wherein said emitter is an infra red light source.

7. A sorter according to any of claims 4–6, wherein said signal device provides an indication to said communication means of the direction of turn of the curve associated therewith.

8. A sorter according to claim 1, wherein the control units are adapted to move the tilting parts to an inclined position of the article-supporting surfaces when passing said curves only on the condition that an article is present on the article-supporting surface.

9. A sorter according to claim 8, wherein at least one detection device is arranged along the stationary track, the detection device comprising article detection means for detecting the presence of articles on the article-supporting surfaces and signal means for providing an output accordingly to communication means of the respective control units.

10. A sorter according to claim 9, wherein said communication means are adapted for wireless communication and said signal means comprises an emitter for providing the output as a wireless signal to said communication means.

11. A sorter according to claim 10, wherein said emitter is an infra red light source.

12. A sorter according to claim 1, wherein the inclination of the article-supporting surfaces in said inclined position is variable and its actual magnitude is determined by the control units from the conveying speed of the conveyor means.

13. A sorter according to claim 1, wherein the speed with which the tilt drive means moves the tilting part to discharge articles at the at least one discharge station is variable and is determined by the control unit from the conveying speed of the conveyor means.

14. A sorter according to claim 1, wherein the at least one induction station loads articles onto the article-supporting surfaces with a velocity component of the article in a direction perpendicularly to the direction of movement of the conveyor means, the control units being adapted to move the tilting parts to an inclined position of the article-supporting surfaces when articles are loaded onto the article-supporting surfaces so as to prevent the articles from sliding off the article-supporting surface in the direction of said velocity component.

15. A sorter according claim 14, wherein the inclination of the article-supporting surfaces in said inclined position is variable and its actual magnitude is determined by the control units from the conveying speed of the conveyor means.

16. A sorter according to claim 1, wherein at least one speed indication device is arranged along the stationary track and comprising speed indication means for providing an output indicative of the conveying speed of the conveyor means to communication means of the respective control units.

17. A sorter according to claim 16, wherein said communication means are adapted for wireless communication and said speed indication means comprises an emitter for providing the output as a wireless signal to said communication means.

18. A sorter according to claim 17, wherein said emitter is an infra red light source.

19. A sorter according to claim 1, wherein the conveying speed of the sorter is at least 2 m per second.

20. A sorter according to claim 19, wherein the conveying speed of the sorter is at least 3 m per second.

21. A sorter according to claim 20, wherein the conveying speed of the sorter is within the range of 3–8 m per second.

22. A sorter according to claim 1, wherein the tilting mechanism comprises:

a frame part;

a tilting part for supporting an article-supporting part of the sorter, the article-supporting part having an article-supporting surface, and drive means for tilting the tilting part of the mechanism, the frame part and the tilting part mutually engaging about at least two points, each of the points being fixed with respect to one of said frame part and said tilting part and being movable along a predetermined path with respect to the other of said two parts, at least one of the predetermined paths being non-linear.

23. A sorter according to claim 1, wherein the control units are adapted to control the speed of the tilting movement during discharge of an article according to a predetermined discharge profile.

24. A sorter according to claim 23, wherein the discharge profile is determined from the weight of the article.

25. A sorter according to claim 23 or 24, wherein the discharge profile is determined from the conveying speed of the sorter.

26. A sorter according to claim 23, wherein the discharge profile is determined depending on whether the article-supporting part supports the article solely or from its position among two or more adjacent article-supporting parts supporting the same article.

27. A sorter according to claim 1, wherein the control units are adapted to control the tilting mechanisms to move articles supported on the respective article-supporting parts to the middle in the transversal direction of the articles-supporting surfaces.

28. A sorter according to claim 1, wherein the control units are adapted to control the tilting mechanisms to move articles supported on the respective article-supporting parts to an edge in the transversal direction of the articles-supporting surfaces.

29. A sorter according to claim 20, wherein the conveying speed of the sorter is within the range of 3–6 m per second.

30. A sorter according to claim 20, wherein the conveying speed of the sorter is within the range of 3–5 m per second.

* * * * *

UNITED STATES PATENT AND TRADEMARK OFFICE
CERTIFICATE OF CORRECTION

PATENT NO.    : 6,712,194 B1                                             Page 1 of 1
DATED         : March 30, 2004
INVENTOR(S)   : Anne-Mette Hjortshøj Abildgaard et al.

It is certified that error appears in the above-identified patent and that said Letters Patent is hereby corrected as shown below:

Title page,
Item [75], Inventors, change the middle name of the second-named inventor from "Gullev" to -- Gulløv --, so that said inventor's full name is -- Jan Gulløv Christensen --.
Item [30], Foreign Application Priority Data, delete the reference to the U.S. Provisional Application, i.e., "Mar. 31, 2000     (US).....................60/193,443".

Signed and Sealed this

Twenty-first Day of December, 2004

JON W. DUDAS
*Director of the United States Patent and Trademark Office*